(12) United States Patent
Nakamura et al.

(10) Patent No.: US 11,852,220 B2
(45) Date of Patent: Dec. 26, 2023

(54) GEAR MECHANISM, SPEED REDUCER AND DRIVE DEVICE USING SPEED REDUCER

(71) Applicant: Nabtesco Corporation, Tokyo (JP)

(72) Inventors: Koji Nakamura, Tokyo (JP); Yuta Nagaya, Tokyo (JP); Mitsuru Shimamoto, Tokyo (JP); Takayuki Okimura, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 167 days.

(21) Appl. No.: 17/442,085

(22) PCT Filed: Mar. 25, 2020

(86) PCT No.: PCT/JP2020/013285
§ 371 (c)(1),
(2) Date: Sep. 22, 2021

(87) PCT Pub. No.: WO2020/217831
PCT Pub. Date: Oct. 29, 2020

(65) Prior Publication Data
US 2022/0163096 A1 May 26, 2022

(30) Foreign Application Priority Data

Apr. 26, 2019 (JP) .................................. 2019-086552
Jul. 9, 2019 (JP) .................................. 2019-127992

(51) Int. Cl.
*F16H 3/00* (2006.01)
*F16H 57/022* (2012.01)

(52) U.S. Cl.
CPC ........... *F16H 3/001* (2013.01); *F16H 57/022* (2013.01); *F16H 2057/0222* (2013.01)

(58) Field of Classification Search
CPC ................... F02B 67/04; F16H 57/022; F16H 2057/0224; F16H 2057/0227; F16H 2057/0222; F16H 2057/0335; F16H 3/001
See application file for complete search history.

(56) References Cited

U.S. PATENT DOCUMENTS 1,812,552 A * 6/1931 Durst .................... F16H 57/028
74/397
2,436,746 A  2/1948 Drought
(Continued)

FOREIGN PATENT DOCUMENTS

CN  201401487 Y  2/2010
JP  63-182238 U  11/1988
(Continued)

OTHER PUBLICATIONS

International Search Report dated Jun. 30, 2020, issued in corresponding International Patent Application No. PCT/JP2020/013285 with English translation (6 pgs.).
(Continued)

*Primary Examiner* — Thomas C Diaz
(74) *Attorney, Agent, or Firm* — Pillsbury Winthrop Shaw Pittman, LLP

(57) ABSTRACT

An aspect of the present invention provides a speed reducer including a supporting block, an input gear rotatably supported on the supporting block, an intermediate gear meshing with the input gear, an output gear meshing with the intermediate gear, and a gear position changing mechanism configured to change a position of the intermediate gear relative to the input and output gears.

14 Claims, 13 Drawing Sheets

(56) References Cited

U.S. PATENT DOCUMENTS

| | | | | |
|---|---|---|---|---|
| 2,444,734 A | * | 7/1948 | Gillett | F16H 57/12 |
| | | | | 74/397 |
| 2,860,015 A | * | 11/1958 | Dunsforth | B62D 55/15 |
| | | | | 384/255 |
| 4,147,071 A | * | 4/1979 | Scribner | F16H 57/12 |
| | | | | 74/421 A |
| 4,532,822 A | | 8/1985 | Godlewski | |
| 4,569,423 A | * | 2/1986 | Hirano | F16H 57/022 |
| | | | | 384/255 |
| 2002/0155915 A1 | | 10/2002 | Tanaka | |
| 2004/0083839 A1 | | 5/2004 | Hahn | |

FOREIGN PATENT DOCUMENTS

| | | |
|---|---|---|
| JP | 7-256969 A | 10/1995 |
| JP | 2002-317857 A | 10/2002 |
| JP | 2003-120316 A | 4/2003 |
| JP | 5231530 B2 | 7/2013 |

OTHER PUBLICATIONS

Extended European Search Report dated Mar. 14, 2023, issued in corresponding European Patent Application No. 20794422.4 (8 pgs.).

\* cited by examiner

GEAR MECHANISM, SPEED REDUCER AND DRIVE DEVICE USING SPEED REDUCER

CROSS-REFERENCE TO RELATED APPLICATIONS

This Application is the U.S. National Stage of PCT/JP2017/013285, filed Mar. 25, 2020, which claims priority to Japanese Patent Application No. 2019-086552, filed Apr. 26, 2019, and Japanese Patent Application No. 2019-127992, filed Jul. 9, 2019. The contents of each of which is incorporated herein by reference in its entirety.

TECHNICAL FIELD

The present invention relates to a gear mechanism, a speed reducer and a drive device using a speed reducer.

BACKGROUND

Industrial robots and machine tools utilize speed reducers to reduce the speed of the rotation of rotational drive sources such as motors. Such speed reducers may have an intermediate gear interposed between an input gear and an output gear such that the intermediate gear may mesh with both of the input and output gears (see, for example, Patent Literature 1).

In the speed reducers of this type, the input and output gears are rotatably supported on a supporting block such as an output rotating body and a casing. The intermediate gear is similarly rotatably supported on the supporting block such as an output rotating body and a casing and meshes with the input and output gears. The rotation of the input gear is decelerated utilizing a speed ratio determined by the ratio in the number of teeth of the output gear to the input gear and then transmitted to the output gear. The shaft supporting the intermediate gear is fixedly attached in a retaining hole that is formed and positioned in the supporting block such that the tooth surface of the intermediate gear meshes with the tooth surface of both of the input and output gears.

RELEVANT REFERENCES

List of Relevant Patent Literature

Patent Literature 1: Publication of Japanese Patent No. 5231530

SUMMARY

For the speed reducers of this type, the input gear may be replaced with another input gear having a different number of teeth in order to, for example, changing the reduction ratio. In this case, a new input gear is attached to the output shaft of the drive source, as a result of which the tooth surface of the input gear is positioned by a different distance away from the tooth surface of the output gear. In order to allow the tooth surface of the intermediate gear to mesh again with the tooth surface of the new input gear, the supporting shaft of the intermediate gear needs to be differently positioned. To do so, the supporting block such as an output rotating body and a casing, where the supporting shaft of the intermediate gear is fixedly attached, needs to be replaced with another member having a differently positioned retaining hole. When the output gear is replaced with another member having a different number of teeth, the supporting block also needs to be replaced for the same reason. As described above, to replace the input and output gears with their counterpart members having a different number of teeth, the conventional speed reducers require that their parts be replaced on a large scale. This resultantly raise the cost of the parts.

The present invention is designed to provide a speed reducer for which the transmission ratio of the input gear to the output gear can be changed without the need of large-scale parts replacement, thereby preventing a rise in cost of the parts and to provide a drive device using the speed reducer. The present invention is also designed to provide a gear mechanism and a speed reducer for which the transmission ratio can be changed within an increased range without the need of large-scale parts replacement, thereby preventing a rise in cost of the parts and to provide a drive device using the speed reducer.

An aspect of the present invention provides a speed reducer including a supporting block, an input gear rotatably supported on the supporting block, an intermediate gear meshing with the input gear, an output gear meshing with the intermediate gear, and a gear position changing mechanism configured to change a position of the intermediate gear relative to the input and output gears.

With the above-described configurations, when at least one of the input gear or the output gear is replaced, the change in distance between the surface of the teeth of the input gear and the surface of the teeth of the output gear may determine how to change the position of the intermediate gear, and the gear position changing mechanism changes the position of the intermediate gear in accordance with the determination. According to the above-described configurations, the reduction ratio of the input gear to the output gear can be changed without the need of replacing the supporting block. Accordingly, the transmission ratio of the input gear to the output gear can be changed without the need of large-scale parts replacement, thereby preventing a rise in cost of the parts.

The gear position changing mechanism may include a retaining member retaining a supporting shaft of the intermediate gear and detachably attached to the supporting block.

In this case, the intermediate gear can be positioned differently by replacing the retaining member itself or changing the orientation of the retaining member when it is assembled onto the supporting block.

The retaining member may include a retaining part for the supporting shaft positioned away from a reference position on the retaining member, the retaining member and the supporting block may constitute a rotational position changing unit for changing a rotational position of the retaining member around the reference position, and the gear position changing mechanism may include the retaining part of the retaining member and the rotational position changing unit.

When at least one of the input gear or the output gear is replaced, the change in distance between the surface of the teeth of the input gear and the surface of the teeth of the output gear may determine how to change the rotational position of the retaining member around the reference position, and the rotational position changing unit changes the rotational position of the retaining member in accordance with the determination. This allows the supporting shaft of the intermediate gear to be differently positioned while the retaining member remains attached to the supporting block. Such a configuration allows the position of the intermediate gear to be easily changed simply by changing the rotational position of the retaining member.

The retaining member may be shaped like a circular cylinder a central axis of which extends through the reference position, the supporting block may have a circular retaining hole formed therein for fittingly receiving an outer peripheral surface of the retaining member, and the rotational position changing unit may include the outer peripheral surface of the retaining member and the retaining hole.

When at least one of the input gear or the output gear is replaced, the change in distance between the surface of the teeth of the input gear and the surface of the teeth of the output gear may determine how to change the rotational angle of the retaining member around the central axis, and the retaining member at the changed rotational angle is fitted in the retaining hole in the supporting block.

The supporting shaft may be integrally formed with the retaining part of the retaining member.

In this case, the supporting shaft of the intermediate gear is integrally formed with the retaining member. This can reduce the number of constituent parts.

An aspect of the present invention provides a speed reducer including a supporting block, an input gear rotatably supported on the supporting block, an intermediate gear meshing with the input gear, an output gear meshing with the intermediate gear, and a retaining member retaining a supporting shaft of the intermediate gear and detachably attached to the supporting block. The retaining member is shaped like a circular cylinder and includes the supporting shaft integrally formed thereon at a position away from a central axis of the retaining member, the supporting block has a circular retaining hole formed therein for fittingly receiving an outer peripheral surface of the retaining member, and the outer peripheral surface of the retaining member and the retaining hole in the supporting block constitute a rotational position changing unit for changing a rotational position of the retaining member around a central axis thereof.

When at least one of the input gear or the output gear is replaced, the change in distance between the surface of the teeth of the input gear and the surface of the teeth of the output gear may determine how to change the rotational position of the retaining member, and the outer peripheral surface of the retaining member at the changed rotational position is fitted in the retaining hole in the supporting block. This allows the intermediate gear to be differently positioned on the supporting block. According to the above-described configurations, the reduction ratio of the input gear to the output gear can be changed simply by changing the rotational position of the retaining member relative to the retaining hole in the supporting block. Accordingly, the transmission ratio of the input gear to the output gear can be changed without the need of large-scale parts replacement, thereby preventing a rise in cost of the parts.

An aspect of the present invention provides a speed reducer including a supporting block, an input gear rotatably supported on the supporting block, an intermediate gear meshing with the input gear, an output gear meshing with the intermediate gear, and a shaft position changing unit for changing a position of a supporting shaft of the intermediate gear.

When at least one of the input gear or the output gear is replaced, the change in distance between the surface of the teeth of the input gear and the surface of the teeth of the output gear may determine how to change the position of the supporting shaft of the intermediate gear, and the shaft position changing unit changes the position of the supporting shaft of the intermediate gear in accordance with the determination. According to the above-described configurations, the reduction ratio of the input gear to the output gear can be changed without the need of replacing the supporting block.

The supporting block may have a plurality of supporting shaft fitting holes formed therein for fittingly receiving the supporting shaft, and the shaft position changing unit may be constituted by the plurality of supporting shaft fitting holes.

When at least one of the input gear or the output gear is replaced, the change in distance between the surface of the teeth of the input gear and the surface of the teeth of the output gear may determine an optimal one of the supporting shaft fitting holes in the supporting block and the supporting shaft is fittingly received in the optimal supporting shaft fitting hole.

An aspect of the present invention provides a drive device including a speed reducer for reducing a speed of rotation of a rotational drive source and outputting the speed-reduced rotation, and a rotary block coupled to an output part of the speed reducer. The speed reducer includes a supporting block, an input gear rotatably supported on the supporting block, an intermediate gear meshing with the input gear, an output gear meshing with the intermediate gear, and a gear position changing mechanism for changing a position of the intermediate gear relative to the input and output gears.

An aspect of the present invention provides a gear mechanism including a supporting block, a first gear rotatably supported on the supporting block, a second gear meshing with the first gear, a third gear meshing with the second gear, and a shaft position changing unit for changing a position of a supporting shaft of the second gear to deal with a third gear having a different number of teeth.

The shaft position changing unit changes the position of the supporting shaft of the second gear in order to deal with a third gear having a different number of teeth. With such a configuration, the transmission ratio of the first gear to the third gear can be changed within an increased range without the need of replacing the supporting block in order to deal with a change in distance between the surface of the teeth of the third gear and the surface of the teeth of the second gear.

According to the present invention, the shaft position changing unit can have a plurality of support hole portions formed in the supporting block and spaced away from each other, and the support hole portions are configured to rotatably support the supporting shaft inserted therein.

According to the present invention, the supporting block can have the plurality of support hole portions arranged along a circumference at a predetermined distance from a rotation center of the first gear.

According to the present invention, the supporting block can have a first base portion and a second base portion facing each other in an axial direction of the second gear and sandwiching the second gear therebetween, and the support hole portions are formed in at least one of a surface of the first base portion facing the second base portion or a surface of the second base portion facing the first base portion.

According to the present invention, the plurality of support holes are arranged along a circumference at a predetermined distance from the rotation center of the first gear and formed alternately between (i) the surface of the first base portion facing the second base portion and (ii) the surface of the second base portion facing the first base portion.

An aspect of the present invention provides a speed reducer including a gear mechanism and a speed reducing unit connected to the gear mechanism. The gear mechanism includes a supporting block, a first gear rotatably supported on the supporting block, a second gear meshing with the first gear, a third gear configured to mesh with the second gear, and a shaft position changing unit for changing a position of a supporting shaft of the second gear to deal with a third gear having a different number of teeth.

The circumference on which the plurality of support holes are arranged is centered on the rotational center of the first gear, and the radius of the circumference can be equal to the distance from the rotational center of the first gear to the rotational center of the second gear.

Advantageous Effects

The above-described speed reducer and drive device can change the transmission ratio of the input gear to the output gear without the need of large-scale parts replacement. The above-described speed reducer and drive device can accordingly prevent a rise in cost of the parts. Furthermore, the above-described gear mechanism, speed reducer and drive device can change the transmission ratio without the need of large-scale parts replacement and within an increased range. The above-described gear mechanism, speed reducer and drive device can accordingly prevent a rise in cost of the parts.

DESCRIPTION OF THE PREFERRED EMBODIMENTS

The embodiments of the present invention will be hereinafter described with reference to the drawings. In the following embodiments, like elements will be denoted by the same reference signs and redundant descriptions will be partly omitted.

First Embodiment

Figure 1:
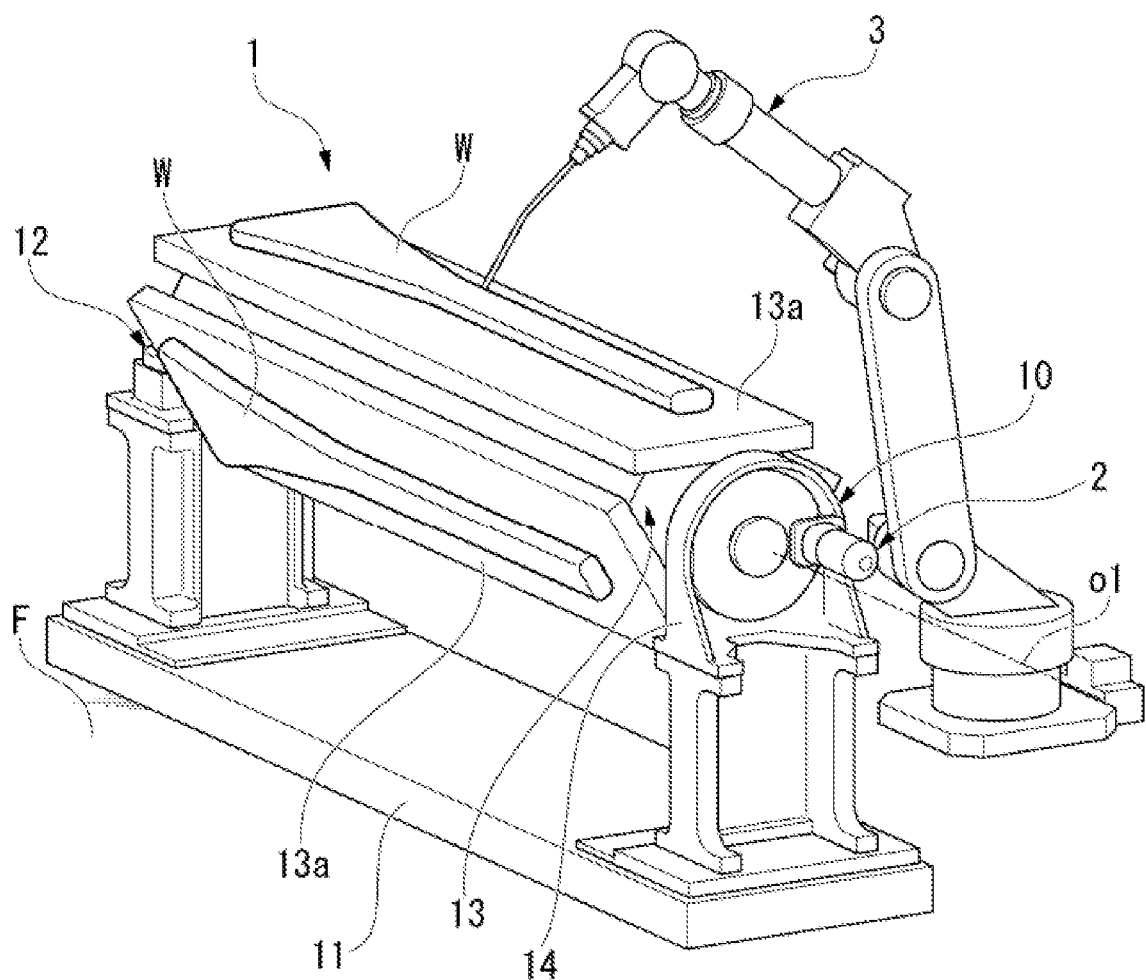
FIG. 1 is a perspective view showing a drive device relating to a first embodiment.

The following first describes a first embodiment shown in FIGS. 1 to 6. FIG. 1 is a perspective view showing a drive device 1 used for, for example, welding and assembling of parts. The drive device 1 includes: a base block 11 placed on a floor surface F; a speed reducer 10 fixedly attached to the upper surface of the base block 11 at one of the longitudinal ends thereof; a motor 2 serving as a rotational driving source for outputting power to the speed reducer 10; a retainer 12 fixedly attached to the upper surface of the base block 11 at the other of the longitudinal ends thereof; and a rotary block 13 supported at its respective longitudinal ends by the speed reducer 10 and the retainer 12. The motor 2 is integrally mounted to the input side of the speed reducer 10. The speed reducer 10 decelerates the rotation of the motor 2 and transmits the resulting rotation to one of the longitudinal ends of the rotary block 13. The retainer 12 rotatably supports the other of the longitudinal ends of the rotary block 13. The rotary block 13 receives the power transmitted from the motor 2 via the speed reducer 10 to rotate about an axis o1, which extends substantially along the horizontal direction.

In the present embodiment, the rotary block 13 has a plurality of work supporting surfaces 13a arranged so as to surround the axis o1. On each work supporting surface 13a, a target or work W is placed. The work W placed on the work supporting surface 13a is moved toward a working position as the motor 2 rotates the rotary block 13. At the working position, there is installed a working device 3 such as a welding robot.

Figure 2:
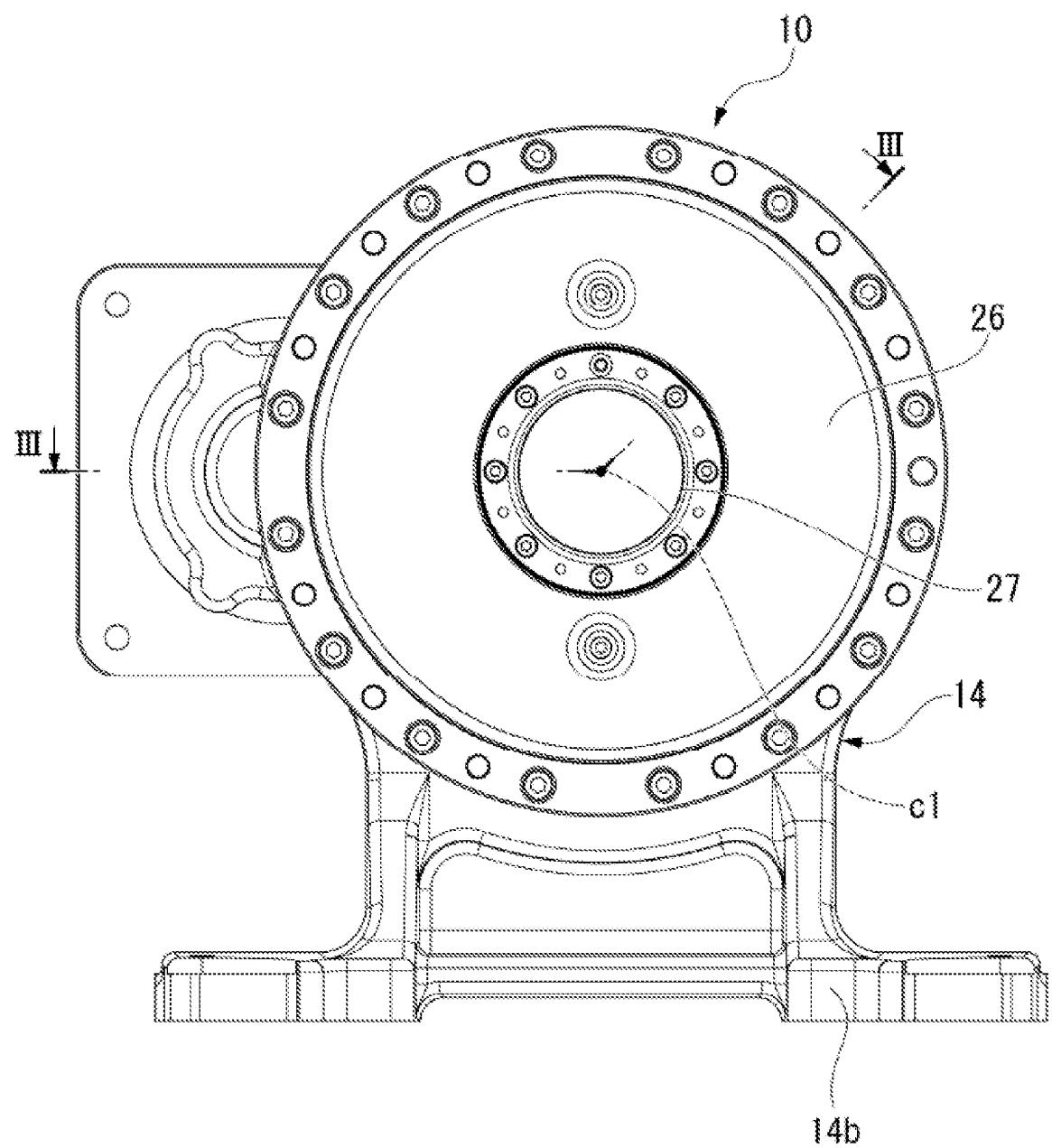
FIG. 2 is a front view of a speed reducer relating to the first embodiment.
Figure 3:
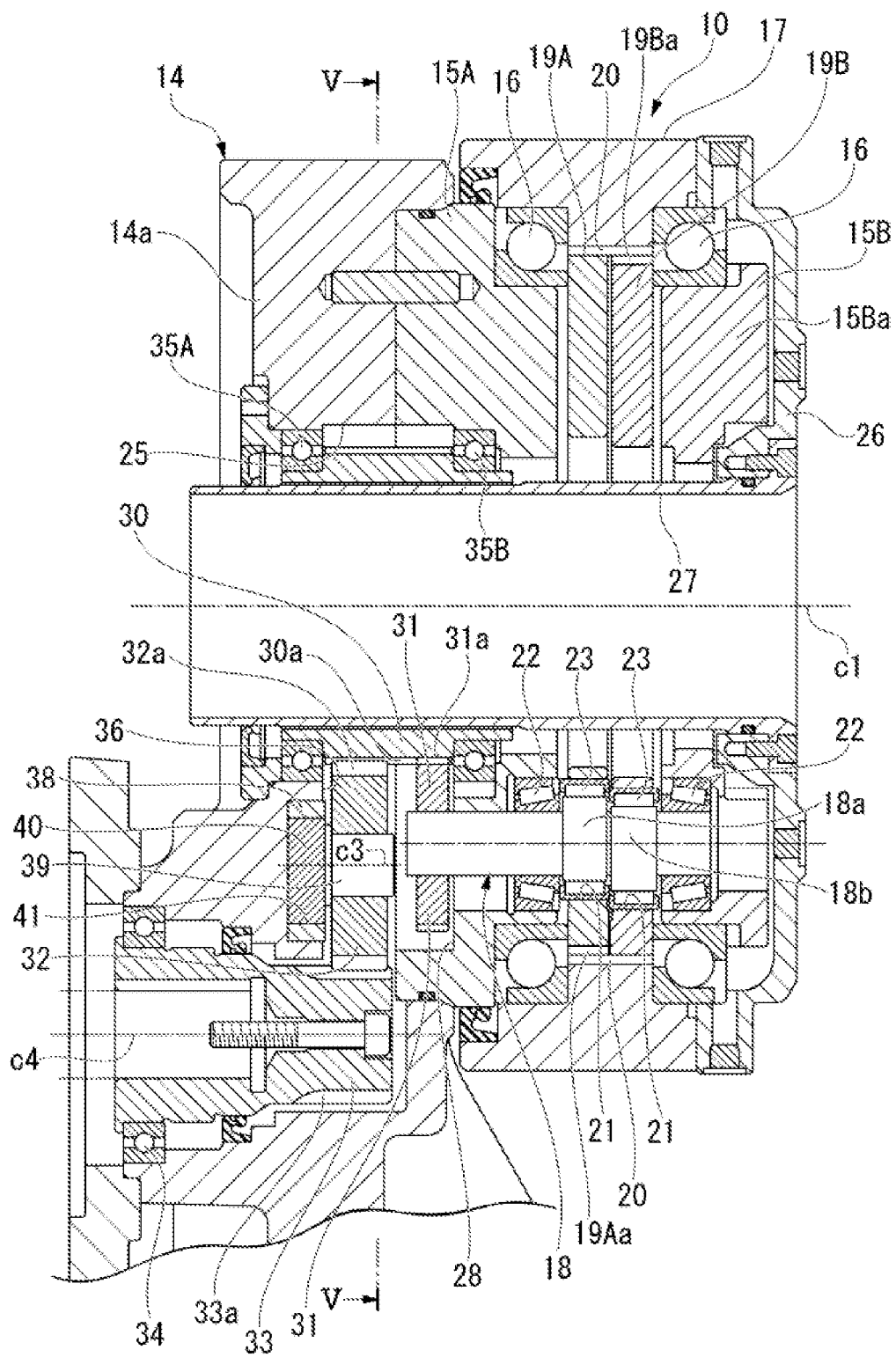
FIG. 3 is a sectional view obtained along the line III-III in FIG. 2 showing the speed reducer relating to the first embodiment.
Figure 4:
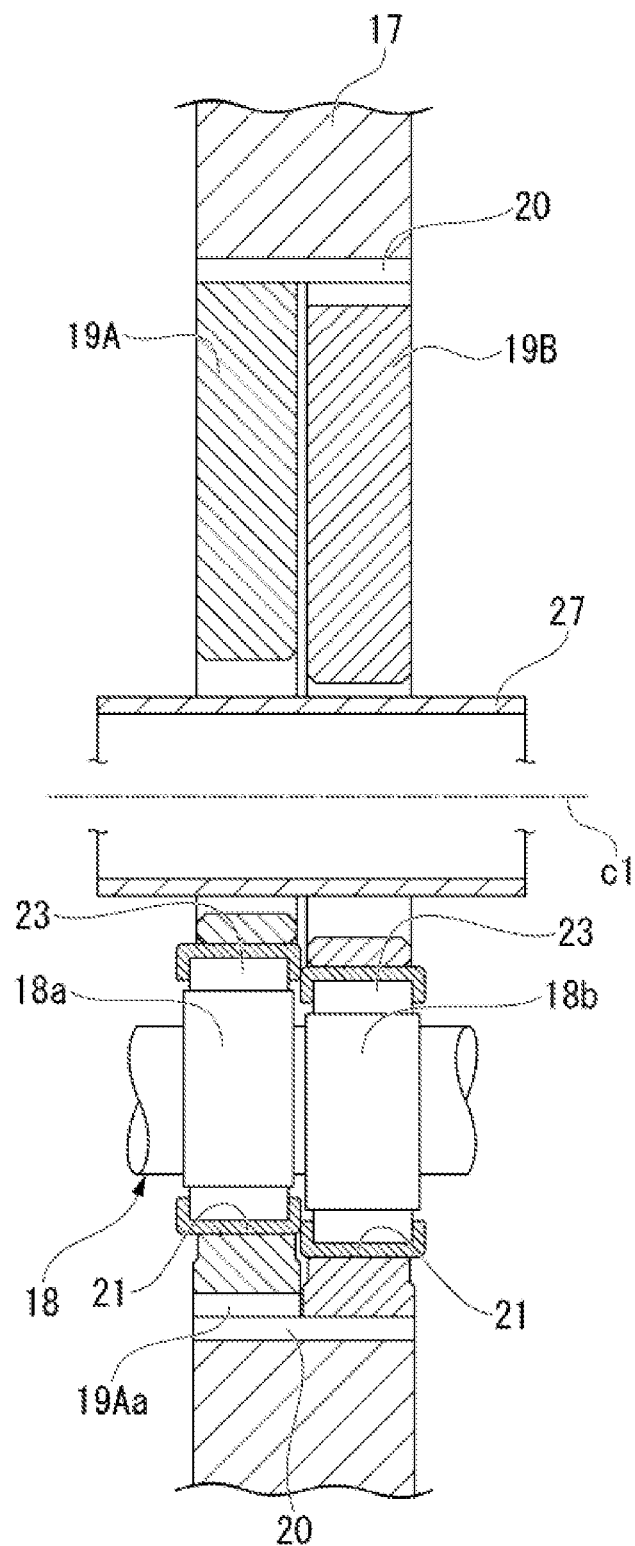
FIG. 4 is a sectional view showing, in an enlarged scale, a part of the speed reducer relating to the first embodiment shown in FIG. 3.
Figure 5:
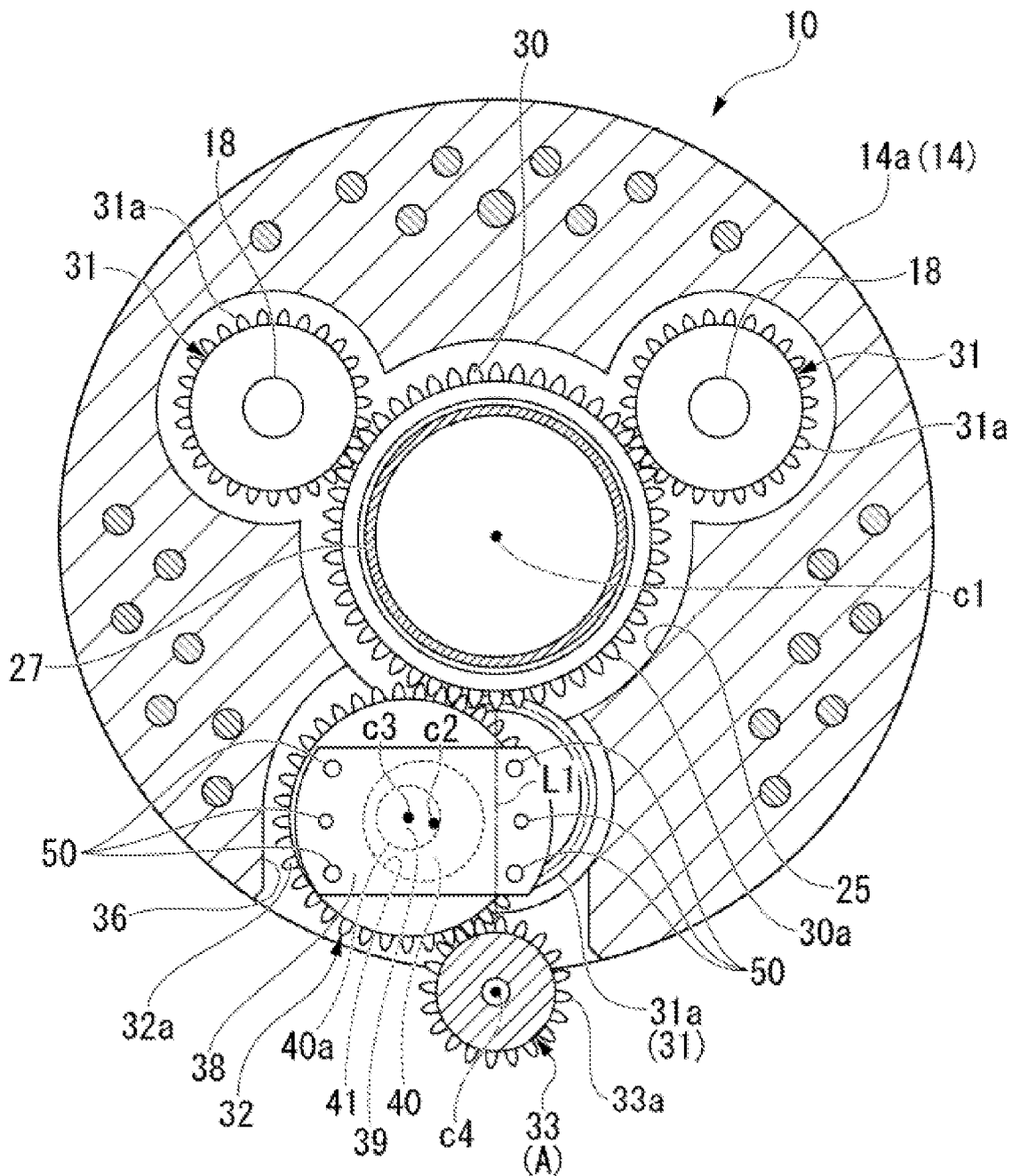
FIG. 5 is a sectional view obtained substantially along the line V-V in FIG. 3, showing the speed reducer relating to the first embodiment.

FIG. 2 is a front view showing the speed reducer 10 as seen from the output side (the side where the rotary block 13 is mounted), and FIG. 3 is a sectional view obtained along the line III-III in FIG. 2. FIG. 4 is a sectional view of the speed reducer 10, showing a part of the sectional view in FIG. 3 in an enlarged state, and FIG. 5 is a sectional view showing the speed reducer 10 obtained substantially along the line V-V in FIG. 3. In FIG. 5, a central gear 30, a crankshaft gear 31, an intermediate gear 32 and the like, which will be described below, are not shown in section. FIG. 5 also shows a retaining member 40 and an attachment base 38, which will be described below. The speed reducer 10 includes a stationary block 14, a first carrier block 15A and a second carrier block 15B, an outer cylinder 17, a plurality of (three) crankshafts 18, and a first revolving gear 19A and a second revolving gear 19B. The stationary block 14 is arranged such that its lower edge is fixedly attached to the upper surface of the base block 11 (see FIG. 1) at one of the ends. The first and second carrier blocks 15A and 15B are integrally coupled to the stationary block 14. The outer cylinder 17 is rotatably supported via bearings 16 on the outer periphery of the first and second carrier blocks 15A and 15B. The crankshafts 18 are rotatably supported by the first and second carrier blocks 15A and 15B. The first and second revolving gears 19A and 19B revolve along with two eccentric portions 18a, 18b of each crankshaft 18, respectively. The speed reducer 10 is disposed on the base block 11 such that the rotational axis c1 of the output unit of the speed reducer 10 coincides with the axis o1 of the drive device 1.

The stationary block 14 includes a perforated base flange 14a (see FIG. 3) shaped like a disc and having a circular through hole 25 formed at the center thereof and a leg 14b extending downward from the base flange 14a (see FIG. 2). The stationary block 14 is arranged such that the lower end of the leg 14b is fixedly attached to the base block 11 by, for example, fastening bolts. On one of the end surfaces of the base flange 14a in the thickness direction, the first carrier block 15A shaped like a perforated disc is overlaid, and the first carrier block 15A is fixedly attached to the base flange 14a integrally by, for example, fastening bolts. On the end surface of the first carrier block 15A that faces away from the base flange 14a, the second carrier block 15B is fixedly attached by, for example, fastening bolts. The second carrier block 15B includes a substrate portion 15Ba and a plurality of support columns (not shown). The substrate portion 15Ba has a disk-like shape with a hole formed therein, and the plurality of support columns extend from the end surface of the substrate portion 15Ba toward the first carrier block 15A. The second carrier block 15B is provided such that the end surface of the support columns faces the end surface of the first carrier block 15A and the support columns are fixed to the first carrier block 15A. An axial gap is maintained between the first carrier block 15A and the substrate portion 15Ba of the second carrier block 15B. In this gap, there are disposed the first revolving gear 19A and the second revolving gear 19B. The first revolving gear 19A and the second revolving gear 19B have relief holes (not shown) formed therein, which are penetrated by the support columns of the second carrier block 15B. The relief holes have a sufficiently larger inner diameter than the support columns, so that the support columns do not prevent the revolution of the first and second revolving gears 19A and 19B.

The outer cylinder 17 extends over the outer peripheral surface of the first carrier block 15A and the outer peripheral surface of the substrate portion 15Ba of the second carrier block 15B. The axially opposite ends of the outer cylinder 17 are rotatably supported by the first carrier block 15A and the substrate portion 15Ba of the second carrier block 15B, respectively, via the bearings 16. In the inner peripheral surface of the axially middle region of the outer cylinder 17 (the region facing the outer peripheral surface of the first and second revolving gears 19A and 19B), there are formed a plurality of pin grooves (not shown) extending in a direction parallel to the rotational center axis c1. Each of the pin grooves receives an inner tooth pin 20 therein. The inner tooth pins 20 have a substantially cylindrical shape and are received in a rotatable manner. The plurality of inner tooth pins 20 attached to the inner peripheral surface of the outer cylinder 17 face the outer peripheral surface of the first and second revolving gears 19A and 19B.

The first revolving gear 19A and the second revolving gear 19B have an outer diameter slightly smaller than the inner diameter of the outer cylinder 17. On the outer peripheral surface of the first and second revolving gears 19A and 19B, there are formed outer teeth 19Aa, 19Ba, respectively, such that the outer teeth 19Aa and 19Ba contact in a meshing manner with the plurality of inner tooth pins 20 disposed on the inner peripheral surface of the outer cylinder 17. The number of the outer teeth 19Aa, 19Ba formed on the outer peripheral surface of the first and second revolving gears 19A and 19B is slightly smaller than the number of the inner tooth pins 20 (by one, for example).

The crankshafts 18 are arranged on the same circumference centered at the rotational center axis c1 of the first and second carrier blocks 15A and 15B. Each of the crankshafts 18 is rotatably supported by the first carrier block 15A and the second carrier block 15B via the bearings 22. The eccentric portions 18a, 18b of each crankshaft 18 penetrate the first revolving gear 19A and the second revolving gear 19B, respectively. The eccentric portions 18a, 18b are rotatably engaged, via eccentric portion bearings 23, with support holes 21 formed in the first revolving gear 19A and the second revolving gear 19B, respectively. The two eccentric portions 18a, 18b of each crankshaft 18 are positioned eccentrically such that they are out of phase with each other by 180° around the axis of the crankshaft 18.

When the plurality of crankshafts 18 receive an external force and resultantly rotate in one direction, the eccentric portions 18a, 18b of each crankshaft 18 revolve in the same direction at a predetermined radius, as a result of which the first revolving gear 19A and the second revolving gear 19B revolve in the same direction at the same predetermined radius. Simultaneously, the outer teeth 19Aa, 19Ba of the first revolving gear 19A and the second revolving gear 19B contact in a meshing manner with the plurality of inner tooth pins 20 retained on the inner peripheral surface of the outer cylinder 17. In the speed reducer 10 of the embodiment, the number of the inner tooth pins 20 retained on the outer cylinder 17 is slightly larger than the respective numbers of the outer teeth 19Aa, 19Ba of the first revolving gear 19A and the second revolving gear 19B. Therefore, while the first revolving gear 19A and the second revolving gear 19B make one revolution, the outer cylinder 17 is pushed to rotate by a predetermined pitch in the same direction as the revolution of the first and second revolving gears 19A, 19B. As a result, the rotation of the crankshafts 18 is decelerated significantly and is output as the rotation of the outer cylinder 17. In the embodiment, since the eccentric portions 18a, 18b of each crankshaft 18 are positioned eccentrically such that they are out of phase with each other by 180° around the axis, the first revolving gear 19A and the second revolving gear 19B revolve out of phase with each other by 180°.

On one of the axial ends of the outer cylinder 17 that faces away from the base flange 14a, there is mounted an output plate 26 having a disk-like shape with a hole formed therein. The output plate 26 covers an end of the second carrier block 15B in a contactless manner. On the axially external end surface of the output plate 26, the rotary block 13 (see FIG. 1) for holding a work can be mounted by, for example, fastening bolts. In the inner peripheral portion of the output plate 26, a tubular portion 27 is mounted and extends through the inner peripheral portion of the second carrier block 15B, the second revolving gear 19B, the first revolving gear 19A, the first carrier block 15A, the base flange 14a without touching them. The tubular portion 27 rotates integrally with the output plate 26.

The speed reducer 10 further includes an input gear 33, a central gear 30 (output gear), and an intermediate gear 32. The input gear 33 is coupled to a rotational shaft (not shown) of the motor 2, the central gear 30 is rotatably held on the inner peripheral surface of the first carrier block 15A and the base flange 14a, and the intermediate gear 32 meshes with the input and central gears 33 and 30 to transmit the rotation of the input gear 33 to the central gear 30. The central gear 30 has a larger diameter than the input gear 33 and has a larger number of teeth than the input gear 33. Thus, the number of rotations of the input gear 33 driven by the motor 2 is reduced at a predetermined reduction ratio and the reduced rotation is transmitted to the central gear 30.

The input gear 33 is rotatably supported, via a bearing 34, on the edge portion of the base flange 14a positioned radially outwardly away from the through hole 25. A rotational axis c4 of the input gear 33 is parallel to a rotational axis c1 of the speed reducer 10 on the output side.

The central gear 30 is long in the axial direction enough to extend over the base flange 14a and the first carrier block 15A. The central gear 30 has outer teeth 30a formed in the axially middle region thereof. One of the axial ends of the central gear 30 is rotatably held via a bearing 35A on the inner peripheral surface of the through hole 25 in the base flange 14a. The other of the axial ends of the central gear 30 is rotatably held via a bearing 35B on the inner peripheral surface of the first carrier block 15A. The central gear 30 rotates about the rotational axis c1.

The end of the first carrier block 15A facing the base flange 14a has a plurality of (three) depressions 28 formed therein and positioned to correspondingly receive the plurality of (three) crankshafts 18, described above. The depressions 28 are open toward the inner peripheral surface of the first carrier block 15A. At the end of each crankshaft 18 facing the base flange 14a, a crankshaft gear 31 is attached to transmit the rotation to the crankshaft 18. The crankshaft gear 31 attached to each crankshaft 18 is enclosed within a corresponding one of the depressions 28. Each crankshaft gear 31 has outer teeth 31a. The outer teeth 31a of each crankshaft gear 31 mesh with a region near the other axial end of the outer teeth 30a of the central gear 30. Accordingly, the rotation input from the input gear 33 into the central gear 30 via the intermediate gear 32 is transmitted to each crankshaft 18 via the crankshaft gear 31. The speed reducer 10 of the present embodiment achieves speed reduction through a front-end speed reducing unit constituted by the input and central gears 33 and 30 and a back-end speed reducing unit constituted by the crankshafts 18, first and second revolving gears 19A and 19B, the outer cylinder 17 and the like.

The end of the base flange 14a facing the first carrier block 15A has a depression 36 formed therein to house the outer teeth 33a of the input gear 33 and the intermediate gear 32. To the bottom surface (the surface facing the end surface of the first carrier block 15A) of the depression 36 in the base flange 14a, the attachment base 38 is attached to support the intermediate gear 32. The depression 36 is partly open to the through hole 25 at the center of the base flange 14a. The intermediate gear 32 arranged in the depression 36 meshes with the outer teeth 30a of the central gear 30 through the radially inner open portion of the depression 36.

The intermediate gear 32 is rotatably supported on a supporting shaft 39 shaped like a circular cylinder. The supporting shaft 39 is integrally formed with the retaining member 40 that has a larger outer diameter and a shorter axial length than the supporting shaft 39 and that is shaped like a circular cylinder. The supporting shaft 39 is integrally formed at a position off the central axis c2 of the retaining member 40. In other words, the supporting shaft 39 is arranged eccentrically (offset radially) relative to the central axis c2 of the retaining member 40. The central axis c3 of the supporting shaft 39 is parallel to the central axis c2 of the retaining member 40. In the present embodiment, the position of the central axis c2 is defined as the reference position on the retaining member 40, and the retaining portion for the supporting shaft 39 is defined as a portion 40a on the retaining member 40 that is connected to the supporting shaft 39. The retaining portion for the supporting shaft 39 is positioned away from the central axis c2, which is defined as the reference position.

The attachment base 38, which is attached within the depression 36, has a circular retaining hole 41 formed therein, where the outer peripheral surface of the retaining member 40 is fitted and fixed. In the present embodiment, the rotational position of the retaining member 40 around the central axis c2 is changed relative to the retaining hole 41, so that the position of the supporting shaft 39 of the intermediate gear 32 can be changed on the base flange 14a (the base block 11). The position of the supporting shaft 39 for the intermediate gear 32 is changed to, for example, replace the input gear 33 with a counterpart member having a different number of teeth and a different outer diameter and to change the reduction ratio achieved by the speed reducer 10. In the present embodiment, the attachment base 38 constitutes, together with the stationary block 14 and the first carrier block 15A, the supporting block for rotatably supporting the input gear 33, the central gear 30 (the output gear) and the intermediate gear 32. In the present embodiment, the retaining hole 41 in the attachment base 38 and the outer peripheral surface of the retaining member 40 fitted in the retaining hole 41 constitute a rotational position changing unit.

When the input gear 33 is replaced with a counterpart member having a different number of teeth and a different outer diameter, a different distance is established between the surface of the outer teeth 33a of the input gear 33 and the surface of the outer teeth 30a of the central gear 30 (output gear). If the supporting shaft 39 remains at the same position, the intermediate gear 32 cannot reliably mesh with the input and central gears 33 and 30. To address this issue, the position of the supporting shaft 39 is appropriately changed, so that the intermediate gear 32 can reliably mesh with the input and central gears 33 and 30.

Figure 6:
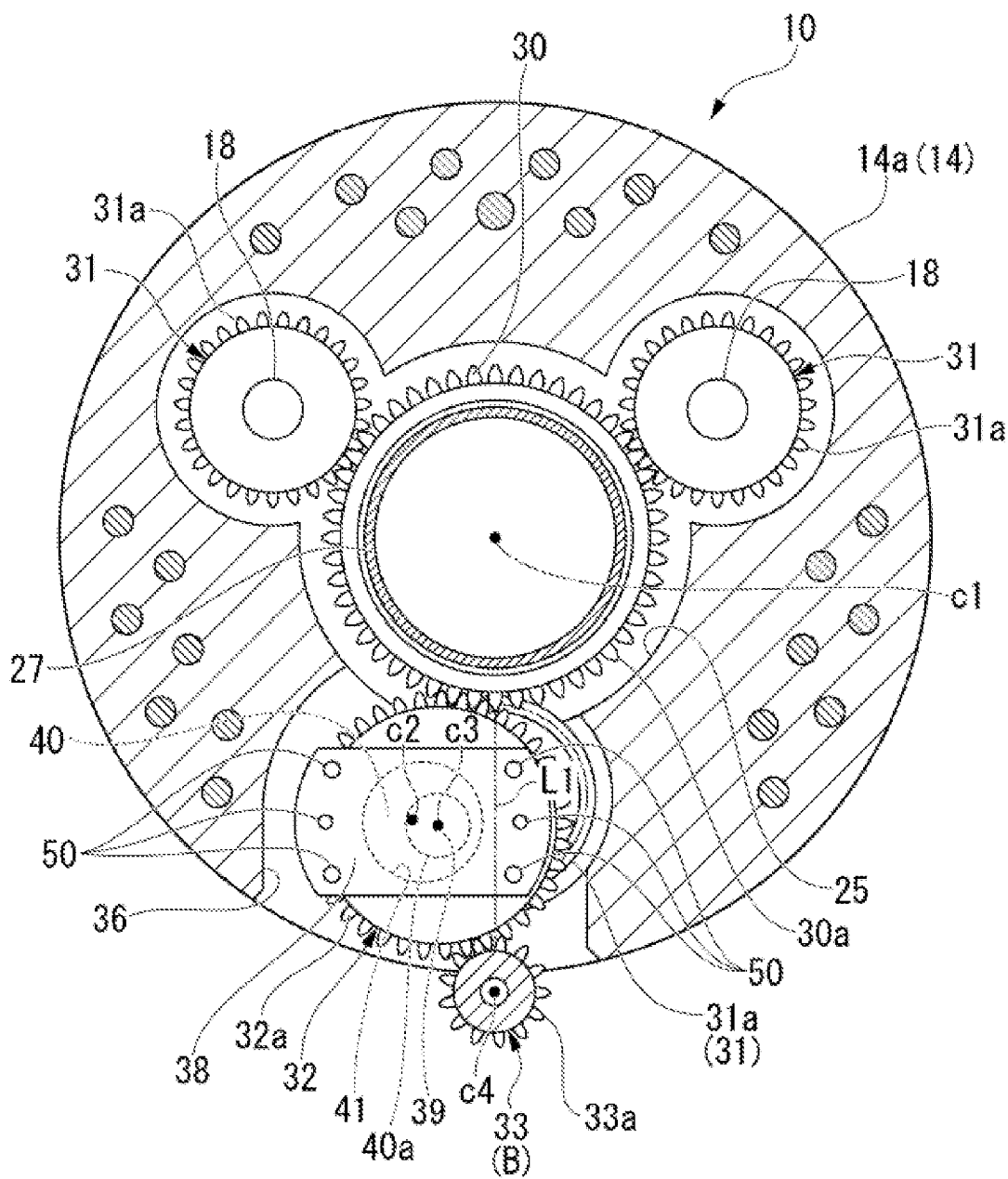
FIG. 6 is a sectional view obtained substantially along the line V-V in FIG. 3, showing the speed reducer relating to the first embodiment.

FIG. 6 is a sectional view similar to the sectional view shown in FIG. 5 and shows the speed reducer 10, where the input gear 33 is replaced with a gear having a smaller diameter. In the example shown in FIG. 5, the central axis c3 of the supporting shaft 39 of the intermediate gear 32 is greatly spaced away from a straight line L1 running the shortest distance between the surface of the teeth of the input gear 33(A) and the surface of the teeth of the central gear 30. In this case, the central axis c3 of the supporting shaft 39 is positioned eccentrically relative to the central axis c2 of the retaining member 40 such that the central axis c3 of the supporting shaft 39 is the furthest from the straight line L1. As shown in the example in FIG. 6, as the input gear 33(B) has a smaller outer diameter, a longer distance is established between the surface of the teeth of the input gear 33(B) and the surface of the teeth of the central gear 30. If the supporting shaft 39 remains at the position shown in FIG. 5, the intermediate gear 32 cannot reliably mesh with the input and central gears 33 and 30. In this case, the retaining member 40 is removed from the retaining hole 41, rotated 180° around the central axis c2 and then fitted again into the retaining hole 41. As a result, the central axis c3 of the supporting shaft 39 is positioned eccentrically relative to the central axis c2 of the retaining member 40 such that the central axis c3 of the supporting shaft 39 is the closest to the straight line L1, which runs the shortest distance between the surface of the teeth of the input gear 33(B) and the surface of the teeth of the central gear 30. As a result, the intermediate gear 32 can reliably mesh with the input and central gears 33 and 30(B).

In the present embodiment, the retaining portion (the portion 40a connected to the supporting shaft) positioned away from the central axis c2 (the reference position) on the retaining member and the rotational position changing unit, which is constituted by the outer peripheral surface of the retaining member 40 and the retaining hole 41, together constitute a gear position changing mechanism (shaft position changing unit).

As described above, in the speed reducer 10 of the present embodiment, the retaining member 40 retaining the supporting shaft 39 of the intermediate gear 32 and the attachment base 38, which is the supporting block, constitute the gear position changing mechanism configured to change the position of the intermediate gear 32. When the input gear 33 is replaced with another gear having a different number of teeth and a different outer diameter, the gear position changing mechanism can position the intermediate gear 32 differently to deal with the change in distance between the surface of the teeth of the input gear 33 and the surface of the teeth of the central gear 30 (output gear). With such a design, the reduction ratio of the input gear 33 to the central gear 30 (output gear) can be changed without the need of replacing the supporting block such as the stationary block 14. Accordingly, the speed reducer 10 relating to the present embodiment can change the transmission ratio of the input gear 33 to the central gear 30 (output gear) without the need of large-scale parts replacement, thereby preventing a rise in cost of the parts.

In the speed reducer 10 relating to the present embodiment, the retaining portion for the supporting shaft 39 (the portion 40a connected to the supporting shaft 39) is positioned away from the reference position (the central axis c2) on the retaining member 40. Between the retaining member 40 and the attachment base 38, which is the supporting block, the rotational position changing unit (the fitting structure constituted by the retaining member 40 and the retaining hole 41) configured to change the rotational position of the retaining member 40 is provided. With such a configuration, in the speed reducer 10 relating to the present embodiment, the position of the intermediate gear 32 can be easily changed simply by changing the rotational position of the retaining member 40.

More specifically, in the present embodiment, the retaining member 40 is shaped like a circular cylinder and, at the same time, the attachment base 38, which is the supporting block, has the retaining hole 41 formed therein to fittingly receive the retaining member 40. The outer peripheral surface of the retaining member 40 and the retaining hole 41 in the attachment base 38 constitute the rotational position changing unit. With such a configuration, the position of the intermediate gear 32 can be easily changed simply by changing the rotational angle of the retaining member 40 when the retaining member 40 is fitted in the retaining hole 41. While the retaining member 40 is shaped like a circular cylinder in the present embodiment, the outer peripheral surface of the retaining member 40 may be alternatively shaped like, for example, a polygon such as a quadrangle.

In the speed reducer 10 relating to the present embodiment, the supporting shaft 39 for the intermediate gear 32 is integrally formed with the retaining member 40. This can reduce the number of constituent parts, thereby lowering the cost. The supporting shaft 39, however, can be a part separate from the retaining member 40, in which case the supporting shaft 39 is press-fit into the retaining member 40 so that the supporting shaft 39 can be fixedly attached to the retaining member 40.

Modification Example

In the above-described embodiment, the retaining member 40 is detachably attached in the retaining hole 41 formed in the attachment base 38. When the input gear 33 is replaced with a part having a different outer diameter, the retaining member 40 is rotated 180° and then fixedly fitted in the retaining hole 41. The speed reducer 10 relating to the present embodiment may be alternatively configured such that the attachment base 38 shown in FIGS. 5 and 6, may be rotated 180° around the central axis c3 and then attached back to the base flange 14a (supporting block). More specifically, this configuration can be realized by, for example, horizontally symmetrically arranging fastening portions 50, which are provided on the left and right sides of the attachment base 38 in the drawings. In this case, the retaining member 40 does not need to be removed from the attachment base 39, so that the attachment base 38 may be integrally formed with the retaining member 40. In this modification example, the attachment base 38 does not constitute a part of the supporting block but a part of the retaining member retaining the supporting shaft 39.

Second Embodiment

Figure 7:
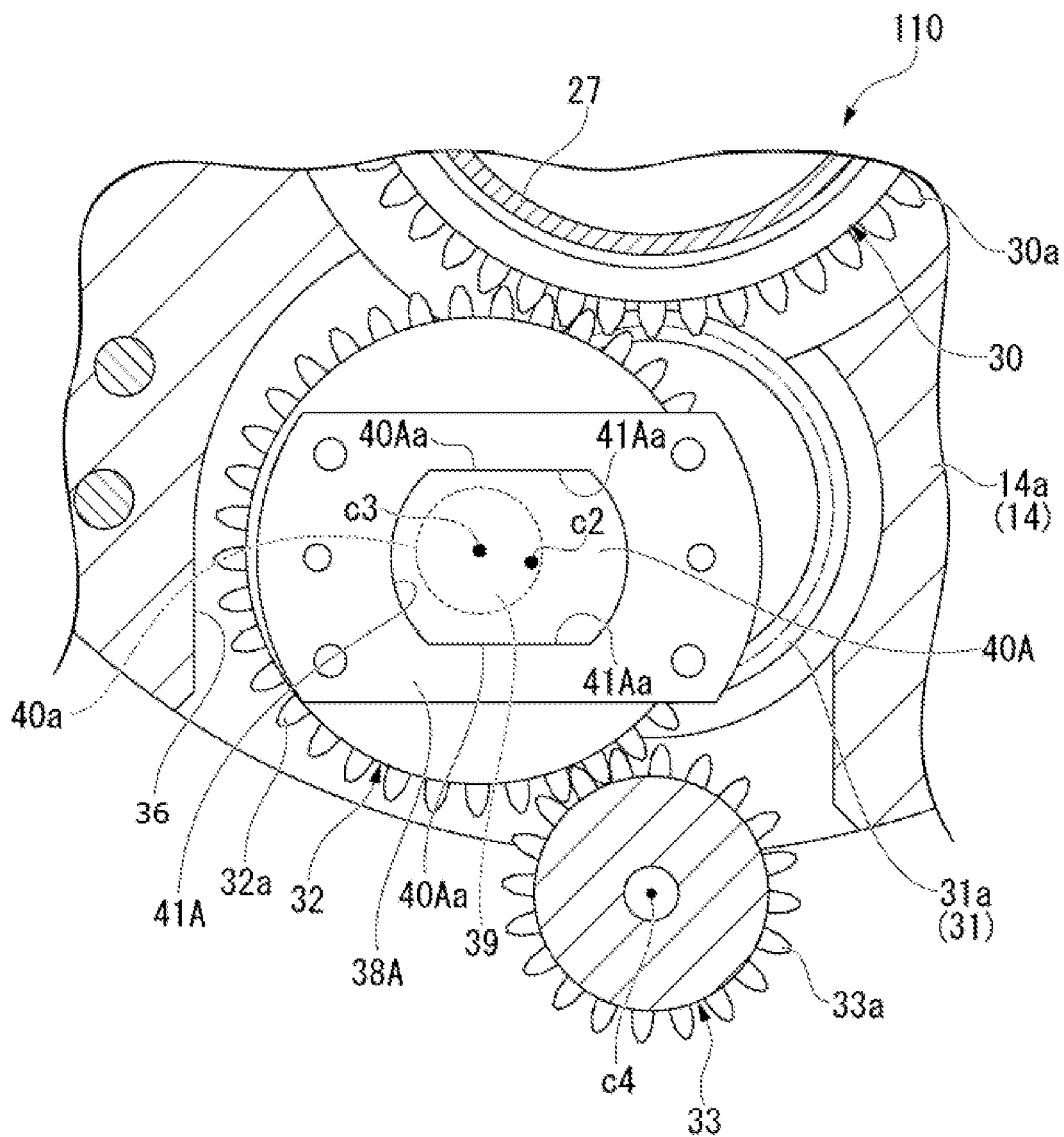
FIG. 7 is a sectional view corresponding to a part of the sectional view in FIG. 5, showing a speed reducer relating to a second embodiment.
Figure 8:
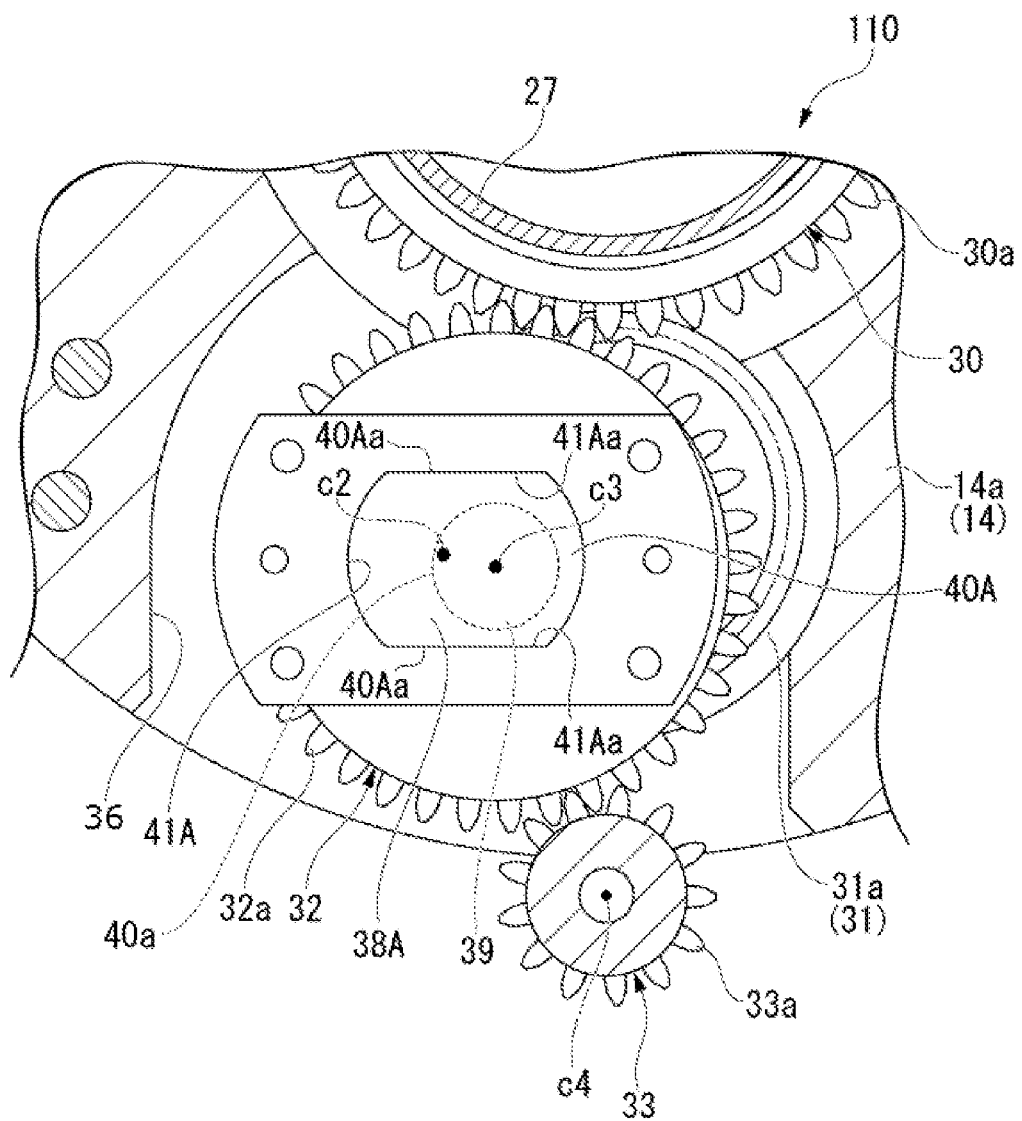
FIG. 8 is a sectional view corresponding to a part of the sectional view in FIG. 6, showing the speed reducer relating to the second embodiment.

FIG. 7 is a sectional view corresponding to a part of the sectional view shown in FIG. 5 and showing a speed reducer 110 relating to a second embodiment, and FIG. 8 is a sectional view corresponding to a part of the sectional view shown in FIG. 6 and showing the speed reducer 110 relating to the second embodiment. The second embodiment is different from the first embodiment only in terms of the fitting structure, which is constituted by a retaining member 40A and an attachment base 38A. The retaining member 40A is shaped like a circular cylinder has, on the outer peripheral surface thereof, a pair of beveled portions 40Aa parallel to each other. The beveled portions 40Aa are symmetrically arranged with respect to the central axis c2 of the retaining member 40A. The attachment base 38A has a retaining hole 41A formed therein, which has a shape matching the shape of the outer periphery of the retaining member 40A. In other words, the retaining hole 41A in the attachment base 38A are defined by two planes 41Aa parallel to each other. The two planes 41Aa come into contact with the two beveled portions 40Aa of the retaining member 40A when the retaining member 40A is fitted into the retaining hole 41A in the attachment base 38A. Accordingly, the retaining member 40A can be fitted in the retaining hole 41A only when it is at two rotational positions that are 180° apart from each other around the central axis c2.

In the speed reducer 110 relating to the second embodiment, the retaining member 40A is allowed to be fitted into the retaining hole 41A only at two rotational positions that are 180° apart from each other around the central axis c2. Accordingly, the rotational position of the retaining member 40A can be accurately fixed at one of two different positions. This allows the surface of the teeth of the intermediate gear 32 to accurately mesh with either one of two different types of input gears 33 having different numbers of teeth and different outer diameters.

Third Embodiment

Figure 9:
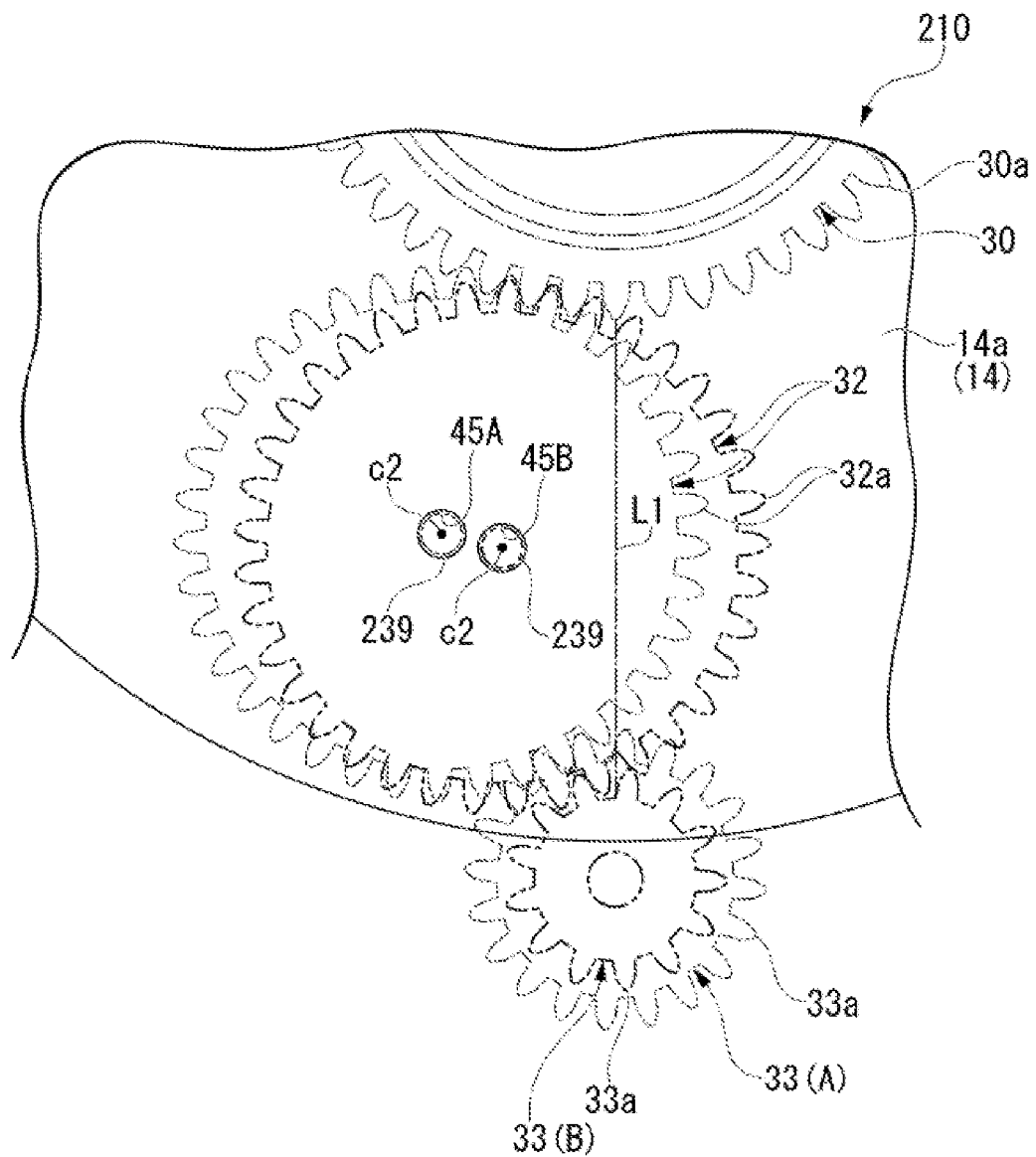
FIG. 9 is an end view showing the inside of a speed reducer relating to a third embodiment.

FIG. 9 is an end view of a speed reducer 210 relating to a third embodiment, showing an internal end surface (the end surface facing the first carrier block) of the base flange 14a (stationary block 14), which is seen from the front side. FIG. 9 uses imaginary lines to indicate two different types of input gears 33(A) and 33(B) having different numbers of teeth and outer diameters, the intermediate gear 32, and the central gear 30 (output gear). In the speed reducer 210 relating to the third embodiment, a plurality of supporting shaft fitting holes 45A and 45B are formed in the internal end surface of the base flange 14a for fittingly receiving a supporting shaft 239 of the intermediate gear 32. The supporting shaft fitting holes 45A and 45B are positioned such that the surface of the teeth of the intermediate gear 32 supported by the supporting shaft 239 can mesh with the selected one of the input gears 33 and the central gear 30. Two supporting shaft fitting holes 45A and 45B are shown in the example in FIG. 9, but three or more supporting shaft fitting holes may be provided. In the present embodiment, no retaining member is provided for retaining the supporting shaft 239, and the supporting shaft 239 is shaped like a simple circular cylinder. In the present embodiment, the supporting shaft fitting holes 45A and 45B constitute the shaft position changing unit configured to change the position of the supporting shaft 239 of the intermediate gear 32.

When the input gear 33(A) having a larger outer diameter is used, the supporting shaft 239 is fitted in and fixedly attached in the supporting shaft fitting hole 45A, which is more distant from the straight line L1 running the shortest distance between the surface of the teeth of the input gear 33(A) and the surface of the teeth of the central gear 30. If the input gear 33(A) is then replaced with the input gear 33(B) having a smaller outer diameter, the supporting shaft 239 is removed from the supporting shaft fitting hole 45A and then fitted in and fixedly attached in the supporting shaft fitting hole 45B, which is closer to the straight line L1 running the shortest distance between the surface of the teeth of the input gear 33(B) and the surface of the teeth of the central gear 30.

In the case of the speed reducer 210 relating to the present embodiment, when the input gear 33 is replaced, an appropriate one of the supporting shaft fitting holes 45A and 45B formed in the base flange 14a is selected and determined by the distance between the surface of the teeth of the input gear 33 and the surface of the teeth of the central gear 30 (output gear). In this manner, the supporting shaft 239 for the intermediate gear 32 can be fixedly attached in an optimal one of the supporting shaft fitting holes 45A and 45B. With such a design, the reduction ratio of the input gear 33 to the central gear 30 (output gear) can be changed without the need of replacing the supporting block such as the stationary block 14. Accordingly, the speed reducer 210 relating to the present embodiment can also change the transmission ratio of the input gear 33 to the central gear 30 (output gear) without the need of large-scale parts replacement, thereby preventing a rise in cost of the parts.

The present invention is not limited to the above-described embodiments but is susceptible of various design modification within the purport of the present invention. For example, the foregoing detailed description of the embodiments is made with reference to the case where the input gear is replaced with another gear having a different number of teeth and a different outer diameter. In a case where the output gear (for example, the central gear) is replaced with another gear having a different number of teeth and a different outer diameter, the supporting shaft of the intermediate gear can be differently positioned in the same manner. In a yet another case where both of the input and output gears are replaced with another gear having a different number of teeth and a different outer diameter, the supporting shaft of the intermediate gear can be differently positioned in the same manner.

In the above-described embodiments, the intermediate and input gears are rotatably supported on the stationary block, but may be alternatively rotatably supported on the first carrier block.

Fourth Embodiment

Figure 10:
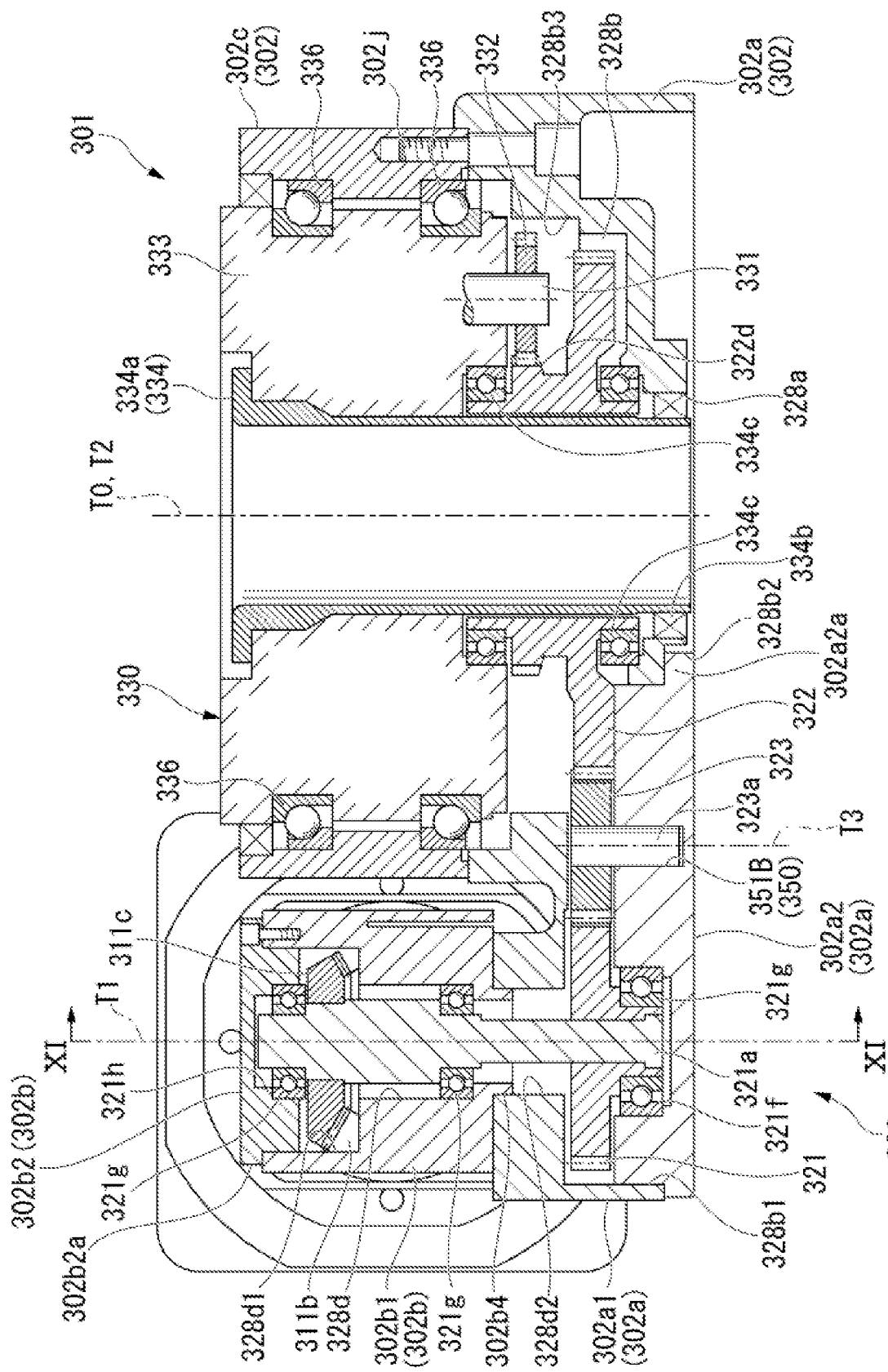
FIG. 10 is a sectional view of a gear mechanism and a speed reducer relating to a fourth embodiment.
Figure 11:
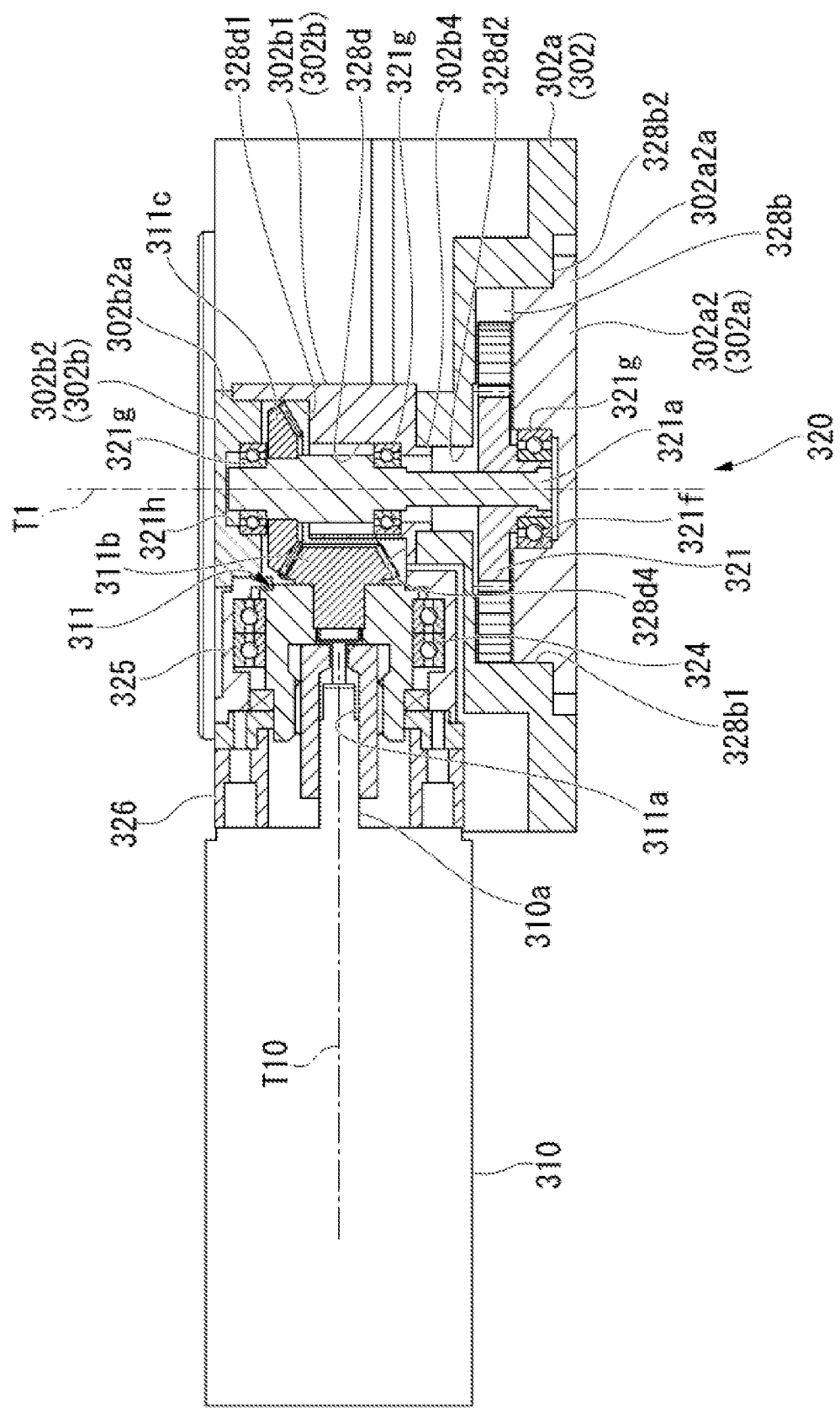
FIG. 11 is a sectional view obtained along the line XI-XI in FIG. 10, showing the gear mechanism and the speed reducer relating to the fourth embodiment.

The following describes a gear mechanism and a speed reducer relating to a fourth embodiment of the present invention with reference to the drawings. FIG. 10 is a sectional view showing the gear mechanism and speed reducer relating to the fourth embodiment, and FIG. 11 is a sectional view obtained along the XI-XI line in FIG. 10. In FIGS. 10 and 11, the reference numeral 301 indicates the speed reducer.

As shown in FIGS. 10 and 11, the speed reducer 301 according to the present embodiment transmits a rotational driving force of a motor (rotary drive source) 310 to a speed reducing unit (output unit) 330 via a gear mechanism 320 and outputs a rotational force about an output axis T0 of the speed reducing unit 330 at a predetermined reduction ratio. The direction along the output axis T0 may be referred to as an upper-lower direction (vertical direction). The speed reducer 301 of the embodiment may be used to drive, for example, a turntable.

In the speed reducer 301, the gear mechanism 320 and the speed reducing unit 330 are housed in a casing 302. The motor 310 is attached externally to the casing 302. The motor 310 drives a drive shaft 310a that extends along a drive axis (input axis) T10 extending in a substantially horizontal direction. An input shaft 311 that has an input axis coinciding with the drive axis T10 is attached to the input axis T10. The input shaft 311 is rotatably supported by the casing 302. The gear mechanism 320 moves in conjunction with the input shaft 311. The speed reducing unit 330 outputs a rotation speed lower than the rotation speed inputted thereto from the gear mechanism 320.

The motor 310 and the gear mechanism 320 are arranged adjacently to each other when viewed in the direction along the output axis T0. Similarly, the gear mechanism 320 and the speed reducing unit 330 are arranged adjacently to each other when viewed in the direction along the output axis T0. The motor 310 and the speed reducing unit 330 are at substantially the same level in the vertical direction along the output axis T0. The gear mechanism 320 is situated at substantially the same level in the vertical direction along the output axis T0 as the motor 310 and the speed reducing unit 330, but slightly below them.

The gear mechanism 320 includes a center gear (first gear) 322 that rotates about a center axis T2, an idler gear (second gear) 323 that meshes with the center gear 322, and an input gear (third gear) 321 that meshes with the idler gear 323 and that receives from the input shaft 311 a driving force provided by the motor 310. The center gear 322, the idler gear 323, and the input gear 321 are all spur gears and are arranged along the same horizontal plane.

An idler axis T3 of the idler gear 323, an input axis T1 of the input gear 321, and a center axis T2 of the center gear 322 are all parallel to the output axis T0. The center axis T2 of the center gear 322 coincides with the output axis T0. The center gear 322 rotates around the center axis T2. The idler gear 323 rotates around the idler axis T3. The input gear 321 rotates around the input gear axis T1.

The casing 302 has a base portion 302a, a first block 302b, and a second block 302c. The base portion 302a is formed in a plate shape and is disposed along a horizontal plane orthogonal to the output axis T0. The base portion 302a is disposed along the lower surface of the speed reducer 301. When viewed in the direction along the output axis T0, the first block 302b that houses the gear mechanism 320 therein and the tubular second block 302c that houses the speed reducing unit 330 therein are arranged side by side on the upper surface of the base portion 302a. The base portion 302a constitutes a supporting block supporting at least the input gear 321, the center gear 322, and the idler gear 323 rotatably.

The first block 302*b* and the second block 302*c* are coupled to the upper surface of the base portion 302*a* such that they are adjacent to each other. The first block 302*b* and the second block 302*c* project upward from the upper surface of the base portion 302*a*. The first block 302*b* and the base portion 302*a* are coupled to each other such that they can seal the speed reducer 301.

The tubular second block 302*c* is disposed such that its central axis coincides with the output axis T0. The second block 302*c* is disposed adjacent to the first block 302*b*. The upper end of the second block 302*c* extends along the upper surface of the speed reducer 301. The second block 302*c* is fastened to the upper surface of the base portion 302*a* by a bolt 302*j* or the like. The second block 302*c* and the base portion 302*a* are coupled to each other such that they seal the speed reducer 301.

The base portion 302*a* includes a plate-like first base portion 302*a*1 and a plate-like second base portion 302*a*2 that has an outline smaller than the first base portion 302*a*1. The first base portion 302*a*1 has an outline to which both the first block 302*b* and the second block 302*c* can be attached. The second base portion 302*a*2 has an outline corresponding to the first block 302*b*, and is fitted into a region of the first base portion 302*a*1 corresponding to the first block 302*b* to form a single unit, which will be described later. The first base portion 302*a*1 and the second base portion 302*a*2 are coupled to each other so as to seal an internal space 328*b* of the speed reducer 301. The first base portion 302*a*1 has a larger thickness than the second base portion 302*a*2 so that the second base portion 302*a*2 can be fitted therein as will be described later. The second base portion 302*a*2 is exposed on the lower surface of the speed reducer 301. The second base portion 302*a*2 is integrally coupled to the first base portion 302*a*1 at a position opposite to the first block 302*b* in the vertical direction.

The first block 302*b* includes a first block side portion 302*b*1 that is integrally coupled to the upper surface of the first base portion 302*a*1 and a first block plate 302*b*2 that is integrally coupled to the upper surface of the first block side portion 302*b*1. The first block side portion 302*b*1 projects upward from the upper surface of the plate-like first base portion 302*a*1. The first block plate 302*b*2 is coupled such that it closes the inner space of the first block side portion 302*b*1. The first block plate 302*b*2 is disposed substantially parallel to the first base portion 302*a*1 and the second base portion 302*a*2. The first block plate 302*b*2 extends along the upper surface of the speed reducer 301. The tip portion of the input shaft 311 that is configured to transmit the rotational driving force of the motor 310 to the gear mechanism 320 penetrates the first block 302*b*. The input shaft 311 is oriented in the horizontal direction.

The motor 310 includes the drive shaft 310*a*. The motor 310 is fixed to the side of the first block side portion 302*b*1. The tip portion of the drive shaft 310*a* serves as the input shaft 311 that penetrates the casing 302. A press-fitting hole 311*a* into which the drive shaft 310*a* of the motor 310 is fitted is formed in the outer edge surface of the input shaft 311. The motor 310 is fixed to a motor support member 326 attached to the first block 302*b*. The drive shaft 310*a* of the motor 310 is inserted into the press-fitting hole 311*a* of the input shaft 311 such that the drive axis T10 extends in the horizontal direction (direction parallel to the base portion 302*a*). The motor 310 is situated slightly above the upper outer surface of the base portion 302*a* (on the first block 302*b* side).

A drive gear 311*b* is attached to the tip portion of the input shaft 311. The drive gear 311*b* is shaped like a disc radially protruding from the outer peripheral surface of the input shaft 311 and teeth are formed on the external edge of the disc. A driven gear 311*c* meshes with the drive gear 311*b*. The drive gear 311*b* and the driven gear 311*c* are bevel gears. The drive and driven gears 311*b* and 311*c* are not limited to bevel gears, and any structure may be adopted provided that the drive axis T10 of the drive gear 311*b* intersects with the input axis T1 of an input shaft 321*a* of the driven gear 311*c* and a driving force can be transmitted from the drive gear 311*b* to the driven gear 311*c*. The input shaft 321*a* extending in the vertical direction coincides with a rotation axis of the driven gear 311*c*. The driven gear 311*c* is disposed close to the second block 302*c* in the vertical direction of the input shaft 321*a*.

The input shaft 321*a* is a shaft member that extends linearly and that has a rotation axis coinciding with the rotation axis of the driven gear 311*c*. The input shaft 321*a* is supported by a bearing 321*g*, which will be described later, such that the input axis T1 is orthogonal to the drive axis T10 of the input shaft 311. That is, the input shaft 321*a* is rotatably supported by the casing 302. In the embodiment, the drive axis T10 of the input shaft 311 is parallel to the upper surface of the speed reducer 301, and the input axis T1 of the input shaft 321*a* is orthogonal to the upper surface of the speed reducer 301. The positional relationship between the input axis T1 of the input shaft 321*a* and the drive axis T10 of the input shaft 311 is not limited to orthogonal to each other, but may be arranged in other positional relationship except for parallel to each other. For example, the drive axis T10 of the input shaft 311 may be tilted such that the end of the drive axis T10 on the motor 310 side is positioned lower in the vertical direction than the other end.

The driven gear 311*c* is a disk-shaped portion that projects radially from the outer peripheral surface of the input shaft 321*a* and has teeth formed on the outer edge thereof. The outer edge of the driven gear 311*c* protrudes into an enlarged diameter portion 328*d*1 formed in the first block 302*b*. As will be described later, the enlarged diameter portion 328*d*1 serves as an upper end of an internal space 328*d* formed in the first block side portion 302*b*1 and is closed by the first block plate 302*b*2.

An internal space 328*b* is formed in the first base portion 302*a*1 at the middle thereof in the vertical direction. The internal space 328*b* is formed along a horizontal plane orthogonal to the output axis T0.

The first base portion 302*a*1 has two through holes 328*a* and 328*d*2 penetrating therethrough in the vertical direction. Both the through hole 328*a* and the through hole 328*d*2 communicate with the internal space 328*b*. The through hole 328*a* is centered on the output axis T0 and is shaped such that the through hole 328*a* and the tubular second block 302*c* are concentrically arranged. The through hole 328*a* extends through the lower surface of the speed reducer 301 to connect together the inner space 328*b* and the outside. The through hole 328*d*2 is formed at a position corresponding to the center of the input gear 321. The through hole 328*d*2 communicates with the internal space 328*b* and also with the internal space 328*d* in the first block 302*b*, which will be described later.

The input gear (third gear) 321, the idler gear (second gear) 323, and the center gear (first gear) 322 included in the gear mechanism 320 are housed in the internal space 328*b* such that they mesh with each other. The internal space 328*b* includes a portion shaped such that it is concentric with the input shaft (supporting shaft) 321*a*, a portion shaped such that it is concentric with an idler shaft 323*a*, and a portion corresponding to a shape concentric with the center gear 322. These portions are formed continuously and define the outline of the internal space 328*b* when seen in plan view.

In the internal space 328*b*, the input gear 321 of the gear mechanism 320 is coupled to the input shaft 311 that transmits a rotational driving force from the motor 310. In the internal space 328*b*, the idler gear 323 meshes with the input gear 321 and is rotatably held by the first base portion 302*a*1 and the second base portion 302*a*2. The center gear 322 is situated in the internal space 328*b* and meshes with the idler gear 323 to receive the rotation of the input gear 321 transmitted thereto.

The center gear 322 has a larger diameter than the input gear 321 and has a larger number of teeth than the input gear 321. Thus, the number of rotations of the input gear 321 driven by the motor 310 is reduced at a predetermined reduction ratio and the reduced rotation is transmitted to the center gear 322.

An opening 328*b*1 is formed in the first base portion 302*a*1 so as to face the input gear 321 and the idler gear 323 in the internal space 328*b* and positioned below them. The second base portion 302*a*2 is fitted into the opening 328*b*1 from below, so that the opening 328*b*1 is closed by the second base portion 302*a*2. The second base portion 302*a*2 is fixed at a position where it reaches halfway of the internal space 328*b* in the vertical direction.

An enlarged diameter portion 328*b*2 is formed in the first base portion 302*a*1 at the edge of the opening 328*b*1 of the internal space 328*b* facing downward. The enlarged diameter portion 328*b*2 is formed by a stepped portion. A flange portion 302*a*2*a* that projects around the second base portion 302*a*2 is fitted into the enlarged diameter portion 328*b*2. In this state, a surface of the enlarged diameter portion 328*b*2 and a surface of the flange portion 302*a*2*a* that face each other in the vertical direction come into contact with each other. Thereby the second base portion 302*a*2 is fixedly positioned relative to the first base portion 302*a*1 in the vertical direction. The enlarged diameter portion 328*b*2 may extend in the horizontal direction to the edge or outline of the first base portion 302*a*1. A sealing member such as an O-ring may be provided around the opening 328*b*1 at a position above the flange portion 302*a*2*a*.

In the second base portion 302*a*2, a bottomed support hole 321*f* having a circular section is formed on the surface facing the inner space 328*b*. The bearing 321*g* is attached in the support hole 321*f*. The bearing 321*g* is attached to the inner peripheral surface of the support hole 321*f*. The bearing 321*g* supports the lower end of the input shaft 321*a*. The input shaft 321*a* has the input axis T1 extending in the vertical direction along the output axis T0. The lower end of the input shaft 321*a* is inserted into the support hole 321*f*. The input gear 321 is attached to the input shaft 321*a* near the lower end of the input shaft 321*a*.

Figure 12:
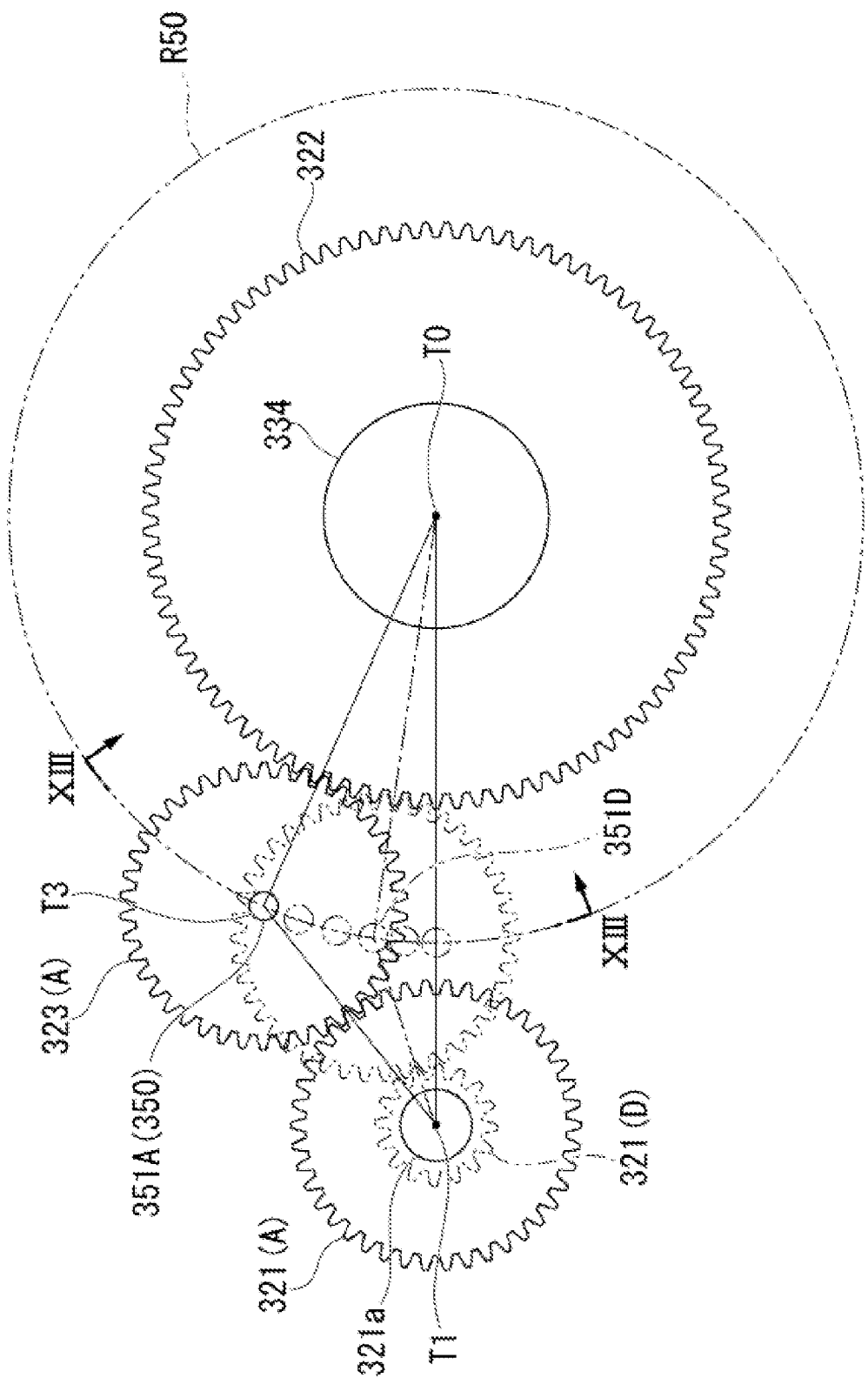
FIG. 12 is used to illustrate a shaft position changing unit relating to the fourth embodiment.
Figure 13:
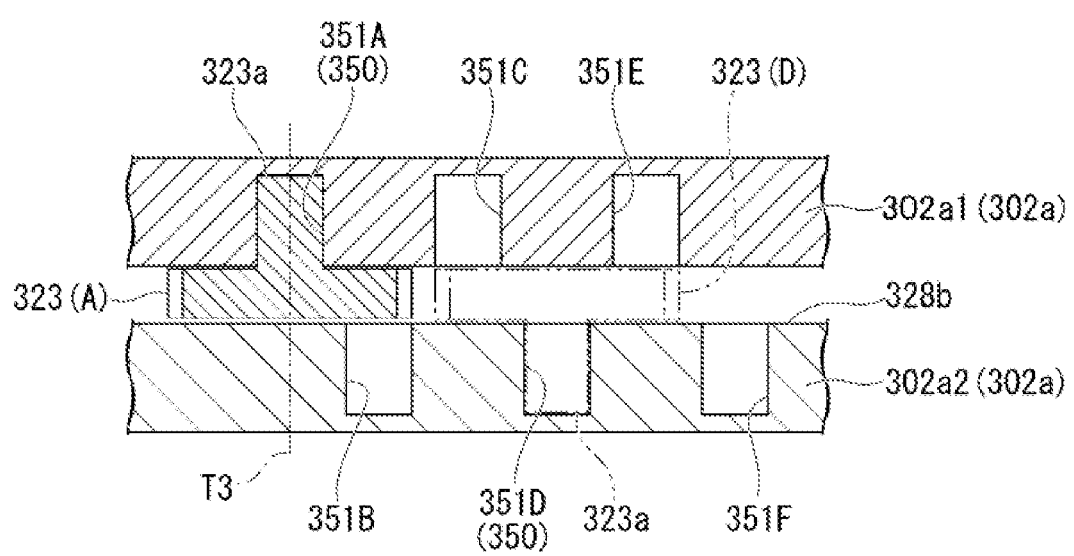
FIG. 13 is a sectional view obtained along the line XIII-XIII in FIG. 12, showing the gear mechanism and the speed reducer relating to the fourth embodiment.

FIG. 12 is used to illustrate a shaft position changing unit relating to the fourth embodiment, and FIG. 13 is a sectional view obtained along the XIII-XIII line in FIG. 12. In the first base portion 302*a*1, bottomed support holes (support hole portions) 351A, 351C and 351E having a circular section are formed on the surface facing the inner space 328*b*. In the second base portion 302*a*2, bottomed support holes (support hole portions) 351B, 351D and 351F having a circular section are formed on the surface facing the inner space 328*b*. In other words, the base portion 302*a* includes the first and second base portions 302*a*1 and 302*a*2 positioned on either side of the idler gear 323 and facing each other in the axial direction of the idler gear 323. Furthermore, the support holes (support hole portions) 351A to 351F are formed in at least one of a surface of the first base portion 302*a*1 facing the second base portion 302*a*2 or a surface of the second base portion 302*a*2 facing the first base portion 302*a*1.

The support holes (support hole portions) 351A to 351F constitute a shaft position changing unit 350 configured to change the position of the idler shaft (supporting shaft) 323*a* of the idler gear 323 in accordance with the varying number of teeth of the input gear 321. The support holes (support hole portions) 351A to 351F are all open toward the internal space 328*b*. The support holes (support hole portions) 351A to 351F are arranged along a circumference R50 at a predetermined distance from the input axis T1 around which the input gear 321 rotates. While arranged on the circumference R50, the support holes (support hole portions) 351A to 351F are provided alternately between the first base portion 302*a*1 and the second base portion 302*a*2. The support holes (support hole portions) 351A to 351F are separated from each other on the circumference R50.

One of the support holes 351A to 351F receives the tip end portion of the cylindrical idler shaft 323*a* inserted thereinto. One of the support holes 351A to 351F that receives the idler shaft 323*a* inserted thereinto rotatably supports the idler shaft 323*a*. The idler shaft 323*a* is connected to the idler gear 323. One of the support holes 351A to 351F is selected to receive the idler shaft 323*a*, so that the idler shaft 323*a* can rotatably support the idler gear 323. The idler shaft 323*a* has the idler axis T3 extending in the vertical direction along the output axis T0.

Every one of the support holes (support hole portions) 351A to 351F is separated from the support hole 321*f* within a plane when seen in the direction extending along the output axis TO. Irrespective of which one of the support holes 351A to 351F is selected to receive the idler shaft 323*a*, the distance between the rotational center of the center gear 322 and the rotational center of the idler gear 323 remains unchanged.

FIG. 10 shows that the idler shaft 323*a* of the idler gear 323 is attached in the support hole (support hole portion) 351B, which is selected from the support holes (support hole portions) 351A to 351F. The tip end portion of the cylindrical idler shaft 323*a* is inserted into the support hole 351B. The idler shaft 323*a* is connected to the idler gear 323.

The internal space 328*d* extending in the vertical direction is formed in the first block side portion 302*b*1 and positioned to face the support hole 321*f*. The internal space 328*d* extends upward, and the lower end thereof communicates with the internal space 328*b* via the through hole 328*d*2. The internal space 328*d* has a circular section corresponding to the through hole 328*d*2. The upper end of the internal space 328*d* is closed by the first block plate 302*b*2. A bottomed support hole 321*h* having a circular section is formed in the lower surface of the first block plate 302*b*2 that faces the internal space 328*d*. The bearing 321*g* is attached in the support hole 321*h*. The bearing 321*g* is attached to the inner peripheral surface of the support hole 321*h*. The bearing 321*g* supports the input shaft 321*a*. The upper end of the input shaft 321*a* is inserted into the support hole 321*h*.

In the first block 302*b*, the enlarged diameter portion 328*d*1 is formed at the upper end of the internal space 328*d*. The driven gear 311*c* is housed in the enlarged diameter portion 328*d*1 below the bearing 321*g*. The lower edge of the first block plate 302*b*2 is fitted into the upper end of the internal space 328*d*. Around the upper edge of the first block plate 302*b*2, a flange portion 302*b*2*a* projects radially outward. The flange portion 302*b*2*a* contacts the upper end of the first block side portion 302*b*1, so that the vertical position of the first block plate 302*b*2 relative to the first block side portion 302*b*1 is fixed. At the same time, the first block side portion 302*b*1 and the first block plate 302*b*2 tightly contact with each other to seal the internal space 328*d*. On the outer peripheral surface of the first block plate 302*b*2, sealing means (a sealing structure or member) such as an O-ring may be provided at a position below the flange portion 302*b*2*a* and inserted into the first block side portion 302*b*1.

In the first block 302*b*, the bearing 321*g* that supports the axially middle portion of the input shaft 321*a* is provided near the lower end of the internal space 328*d*. The bearing 321*g* is attached to the inner peripheral surface of the first block side portion 302*b*1 facing the internal space 328*d*. At the lower end of the first block side portion 302*b*1 that defines the lower end of the internal space 328*d*, a ridge 302*b*4 protruding downward is formed around the through hole 328*d*2. The ridge 302*b*4 is inserted into the through hole 328*d*2 and is used for aligning the first block side portion 302*b*1 with the first base portion 302*a*1.

In the first block 302*b*, a through hole 328*d*4 extends in the horizontal direction and is positioned, in the vertical direction, at the level below and at the level corresponding to the enlarged diameter portion 328*d*1 of the internal space 328*d*. The through hole 328*d*4 extends in the direction from the input shaft 321*a* toward the motor 310. The drive gear 311*b* is housed in the through hole 328*d*4. An input shaft support portion 325 is formed outside the through hole 328*d*4 such that it surrounds the periphery of the input shaft 311 and is continuous with the first block side portion 302*b*1. The input shaft support portion 325 has a tubular shape that surrounds the periphery of the input shaft 311, and a bearing 324 is disposed inside the input shaft support portion 325. The bearing 324 rotatably supports the input shaft 311. A motor support member 326 is fixed on the outer side of the input shaft support portion 325 at a position close to the motor 310. The input shaft support portion 325 has a diameter determined by the through hole 28*d*4. The input shaft support portion 325 and the first block side portion 302*b*1 house the input shaft 311 and the drive gear 311*b* and seal them from the outside.

An opening 328*b*3 is formed in the first base portion 302*a*1 above the internal space 328*b* such that it faces the center gear 322. The opening 328*b*3 is closed by the second block 302*c* and the speed reducing unit 330. The opening 328*b*3 has an outline centered on the output axis T0 and concentric with the second block 302*c* and the center gear 322, when seen in plan view.

In the internal space 328*b*, the center gear 322 is rotatably supported by a hollow cylinder 334. The cylinder 334 vertically penetrates the internal space 328*b*. The cylinder 334 is disposed centering on the output axis T0. The cylinder 334 penetrates the speed reducer 301 in the vertical direction. The lower end of the cylinder 334 is fitted in the through hole 328*a*. A seal member 334*b* may be provided between the lower end of the cylinder 334 and the inner surface of the through hole 328*a*. At the upper end of the cylinder 334, a flange portion 334*a* is formed and exposed on the upper surface of the speed reducing unit 330. The flange portion 334*a* is recessed downward from the upper surface of the speed reducer 301. The cylinder 334 is disposed substantially at the center of the opening 328*b*3.

A gear 322*d* is integrally formed with the center gear 322 and they are concentrically arranged. The gear 322*d* has a smaller number of teeth and a smaller diameter than the center gear 322. The center gear 322 and the gear 322*d* are rotatable as a single unit around the cylinder 334. The gear 322*d* is disposed above the center gear 322. The gear 322*d* is closer to the speed reducing unit 330 than is the center gear 322. The gear 322*d* is situated on the input side of the speed reducing unit 330. The gear 322*d* is housed in the opening 328*b*3. The lower end of the center gear 322 is rotatably supported via a bearing 334*c* and positioned near the through hole 328*a*. The upper end of the center gear 322 is supported via the bearing 334*c* rotatably relative to the speed reducing unit 330.

The speed reducing unit 330 is housed in the tubular second block 302*c* fixed to the first base portion 302*a*1. The speed reducing unit 330 may be, for example, an eccentric oscillating type speed reducer. The speed reducing unit 330 includes a carrier 333 arranged within the second block 302*c* and a transmission shaft 331 that rotates as the center gear 322 rotates.

The carrier 333 is rotatable relative to the second block 302*c* about the output axis T0. Specifically, the relative rotation between the second block 302*c* and the carrier 333 is allowed by the bearing 336 provided between the inner periphery of the second block 302*c* and the outer periphery of the carrier 333. The carrier 333 is exposed on the upper surface of the speed reducing unit 330. The carrier 333 situated on the output side of the speed reducing unit 330. The lower end of the speed reducing unit 330 faces the opening 328*b*3. The cylinder 334 penetrates the carrier 333 at the center thereof. The axis of the carrier 333 coincides with the output axis T0, which is the axis of the cylinder 334. The cylinder 334 may be fixed to, for example, the carrier 333.

The transmission shaft 331 is situated on the input side of the speed reducing unit 330, which receives a rotational driving force transmitted from the center gear 322. The transmission shaft 331 is rotatably attached to the carrier 333 and has an axis extending parallel to the output axis T0. The speed reducing unit 330 uses the rotation of the transmission shaft 331 to rotate the second block 302*c* and the carrier 333 relative to each other at a speed lower than the rotation speed of the transmission shaft 331. The transmission shaft 331 is provided with a transmission gear 332 that meshes with the gear 322*d*. The transmission gear 332 is a spur gear. The transmission gear 322 is disposed above the center gear 322.

The speed reducer 301 relating to the embodiment may be fixed to a flat surface where the speed reducer is supposed to be installed. Then, a turntable or the like may be placed on the upper surface of the carrier 333. In this case, the turntable is fixed to the upper surface of the carrier 333 by a fastening bolt or the like.

In the speed reducer 301, when the motor 310 is driven, the drive shaft 310*a* rotates and the input shaft 311, which is coaxially arranged and integrally formed with the drive shaft 310*a*, rotates. Accordingly, the driven gear 311*c* meshing with the drive gear 311*b* provided on the input shaft 311 is driven, and the input shaft 321*a* of the gear mechanism 320 rotates about the input axis T1. As the input shaft 321*a* rotates, the input gear 321 coupled to the input shaft 321*a* rotates around the input axis T1. The rotation of the input gear 321 causes the idler gear 323 meshing with the input gear 321 to rotate around the idler shaft 323*a*. As the idler gear 323 rotates, the center gear 322 meshing with the idler gear 323 rotates around the output axis T0. As the center gear 322 rotates, the gear 322*d*, which is coaxially arranged and integrally formed with the center gear 322, rotates. As a result, the transmission gear 332 meshing with the gear 322*d* rotates, and the transmission shaft 331 integrated with the transmission gear 332 rotates. Due to the rotation of the transmission shaft 331, the second block 302*c* and the carrier 333 that serve as the outer cylinder of the speed reducing unit 330 rotate relatively to each other at a speed slower than the rotation speed of the transmission shaft 331. This causes the turntable to rotate.

In the speed reducer 301 relating to the present embodiment, one of a plurality of types of input gears 321 is selected, and the shaft position changing unit 350 changes the position to which the idler gear 323 is attached in accordance with the selection. In this way, one of a plurality of transmission ratios can be selected. FIGS. 12 and 13 show the shaft position changing unit 350, which is constituted by six support holes (support hole portions) 351A to 351F, and the idler shaft 323a of the idler gear 323 is inserted into the support hole 351A. When seen in the direction along the input axis T1, the support hole 351F is arranged such that the idler axis T3 runs on the straight line connecting together the input axis T1 and the center axis T2. When seen in the direction along the input axis T1, the support holes 351A to 351E are arranged in the order of the support hole 351E, the support hole 351D, the support hole 351C, the support hole 351B and the support hole 351A. In this order, the distance between the support holes 351A to 351E and the straight line connecting together the input axis T1 and the center axis T2 increases, and the support hole 351A is the furthest. Among the support holes 351A to 351F, the support hole 351A is the most distant from the straight line connecting together the input axis T1 and the center axis T2.

Here, an input gear 321(A) has the largest outer diameter and the largest number of teeth in the speed reducer 301 relating to the present embodiment. When the input gear 321(A) is used, the idler shaft 323a of the idler gear 323 is inserted into the support hole 351A. The idler gear 323 is attached to the first base portion 302a1 of the base portion 302a via the support hole 351A.

As indicated by the imaginary lines in FIGS. 12 and 13, when the input gear 321(D) having a smaller outer diameter and a smaller number of teeth than the input gear 321(A) is selected, the idler shaft 323a of the idler gear 323 is inserted into the support hole 351D. The idler gear 323 is attached to the second base portion 302a2 of the base portion 302a via the support hole 351D.

Similarly, the idler gear 323 is attached to the base portion 302a via any one of the support holes 351A to 351F. This allows the use of input gears 321 having different outer diameters and different numbers of teeth.

In the speed reducer 301 relating to the present embodiment, the input gear 321 is replaced with another input gear 321 having a different outer diameter and a different number of teeth in the following manner. An appropriate one of the support holes 351A to 351F, which are formed in the base portion 302a and together constitute the shaft position changing unit 350, is selected in accordance with a change in the distance between the surface of the teeth of the input gear 321 and the surface of the teeth of the center gear 322. In this way, the idler shaft 323a of the idler gear 323 can be fixedly attached at an optimal position. With such a design, the reduction ratio of the input gear 321 to the center gear 322 can be changed without the need of replacing the supporting block such as the base portion 302a and within a further increased range. Accordingly, the speed reducer 301 relating to the present embodiment can change the transmission ratio of the input gear 321 to the center gear 322 within an increased range without the need of large-scale parts replacement, thereby preventing a rise in cost of the parts.

In addition, the support holes 351A to 351F are arranged along the circumference R50. With such an arrangement, the transmission ratio of the input gear 321 to the center gear 322 can be changed within an increased range simply by changing the position where the idler gear 323 is attached in accordance with a selected one of the input gears 321(A) to 321(F) having different outer diameters and different numbers of teeth. This can in turn reduce a rise in the cost of parts.

While arranged on the circumference R50, the support holes 351A to 351F are provided alternately between the first base portion 302a1 and the second base portion 302a2. With such an arrangement, the transmission ratio can be changed in smaller units, when compared with the case where the support holes 351A to 351F are provided in only one of the first and second base portions 302a1 and 302a2. While the above-described embodiment allows the transmission ratio to be changed in smaller units, the support holes 351A to 351F can be arranged at such intervals that one of the first and second base portions 302a1 and 302a2 can still achieve a sufficient strength.

The present invention is not limited to the above-described embodiments but is susceptible of various design modification within the purport of the present invention. For example, although six support holes 351A to 351F are provided in the above-described embodiment, the present invention is not limited to such. Although the support holes 351A to 351F are provided alternately between the first base portion 302a1 and the second base portion 302a2 in the above-described embodiment, the present invention is not limited to such. The support holes 351A to 351F, which constitute the shaft position changing unit 350, can be differently provided in accordance with one or more desired transmission ratios of the input gear 321 to the center gear 322.

Although the speed reducer 301 is placed on the surface extending in the horizontal direction and the speed reducer 301 is used for driving the turntable in the above embodiment, the present invention is not limited to such configuration and application. The speed reducer 301 relating to the present embodiment may be fixed to a mounting surface extending in a direction other than the horizontal direction. Although the carrier 333 is the output side in the description of the speed reducing unit 330, the present invention is not limited to this configuration. Either the carrier 333 or the tubular second block 302c may constitute the output side.

The gear mechanism according to the invention is not only applied in the speed reducer 301 relating to the above-described embodiment, but may be applied to any machines or devices.

LIST OF REFERENCE NUMBERS

1—drive device, 2—motor (rotational drive source), 10, 110, 210, 301—speed reducer, 13—rotary block, 14—stationary block (supporting block), 15A—first carrier block (supporting block), 30—central gear (output gear), 32—intermediate gear, 33—input gear, 38, 38A—attachment base (supporting block), 39, 239—supporting shaft, 40, 40A—retaining member, 40a—portion connected to supporting shaft (retaining portion), 41—retaining hole, 45A, 45B—supporting shaft fitting hole, c2—central axis, 302a1—first base portion (supporting block), 302a2—second base portion (supporting block), 320—gear mechanism, 321—input gear (third gear), 321a—input shaft (supporting shaft), 322—center gear (first gear), 322a—center shaft (supporting shaft), 323—idler gear (second gear), 323a— idler shaft (supporting shaft), 350—shaft position changing unit, 351A to 351F—support hole (support hole portion).

What is claimed is:

1. A speed reducer comprising:
a supporting block;
an input gear rotatably supported on the supporting block;
an intermediate gear meshing with the input gear;
an output gear meshing with the intermediate gear;
a supporting shaft configured to rotatably support the intermediate gear; and
a gear position changing mechanism configured to change a position of the intermediate gear relative to the input and output gears,
wherein the gear position changing mechanism includes:
a retaining member detachably attached to the supporting block; and
a retaining portion on the retaining member and connected to the supporting shaft, and an outer diameter of the retaining member is larger than an outer diameter of the supporting shaft.

2. The speed reducer of claim 1,
wherein the retaining member includes a retaining part for the supporting shaft positioned away from a reference position on the retaining member,
wherein the retaining member and the supporting block constitute a rotational position changing unit for changing a rotational position of the retaining member around the reference position, and
wherein the gear position changing mechanism includes the retaining part of the retaining member and the rotational position changing unit.

3. The speed reducer of claim 2,
wherein the retaining member is shaped like a circular cylinder a central axis of which extends through the reference position,
wherein the supporting block has a circular retaining hole formed therein for fittingly receiving an outer peripheral surface of the retaining member, and
wherein the rotational position changing unit includes the outer peripheral surface of the retaining member and the retaining hole.

4. The speed reducer of claim 3, wherein the supporting shaft is integrally formed with the retaining part of the retaining member.

5. A speed reducer comprising:
a supporting block;
an input gear rotatably supported on the supporting block;
an intermediate gear meshing with the input gear;
an output gear meshing with the intermediate gear;
a supporting shaft configured to rotatably support the intermediate gear;
a retaining member and detachably attached to the supporting block; and
a retaining portion on the retaining member and connected to the supporting shaft,
wherein an outer diameter of the retaining member is larger than an outer diameter of the supporting shaft,
wherein the retaining member is shaped like a circular cylinder and includes the supporting shaft integrally formed thereon at a position away from a central axis of the retaining member,
wherein the supporting block has a circular retaining hole formed therein for fittingly receiving an outer peripheral surface of the retaining member, and
wherein the outer peripheral surface of the retaining member and the retaining hole in the supporting block constitute a rotational position changing unit for changing a rotational position of the retaining member around a central axis thereof.

6. A drive device comprising:
the speed reducer of claim 5 for reducing a speed of rotation of a rotational drive source and outputting the speed-reduced rotation; and
a rotary block coupled to an output part of the speed reducer.

7. A speed reducer comprising:
a supporting block;
an input gear rotatably supported on the supporting block;
an intermediate gear meshing with the input gear;
an output gear meshing with the intermediate gear;
a supporting shaft configured to rotatably support the intermediate gear; and
a shaft position changing unit for changing a position of the supporting shaft of the intermediate gear,
wherein the shaft position changing unit includes:
a retaining member detachably attached to the supporting block; and
a retaining portion on the retaining member and connected to the supporting shaft, and
an outer diameter of the retaining member is larger than an outer diameter of the supporting shaft.

8. The speed reducer of claim 7,
wherein the supporting block has a plurality of supporting shaft fitting holes formed therein for fittingly receiving the supporting shaft, and
wherein the shaft position changing unit further includes the plurality of supporting shaft fitting holes.

9. A drive device comprising:
the speed reducer of claim 7 for reducing a speed of rotation of a rotational drive source and outputting the speed-reduced rotation; and
a rotary block coupled to an output part of the speed reducer.

10. A drive device comprising:
the speed reducer of claim 1 for reducing a speed of rotation of a rotational drive source and outputting the speed-reduced rotation; and
a rotary block coupled to an output part of the speed reducer.

11. A gear mechanism comprising:
a supporting block;
a first gear rotatably supported on the supporting block;
a second gear meshing with the first gear;
a third gear meshing with the second gear; and
a shaft position changing unit for changing a position of a supporting shaft of the second gear to deal with a third gear having a different number of teeth,
wherein the shaft position changing unit has a plurality of support hole portions formed in the supporting block and spaced away from each other, and the support hole portions are configured to rotatably support the supporting shaft inserted therein,
wherein the supporting block has a first base portion and a second base portion facing each other in an axial direction of the second gear and sandwiching the second gear therebetween, and
wherein the support hole portions are formed in at least one of a surface of the first base portion facing the second base portion or a surface of the second base portion facing the first base portion, and
wherein the supporting block has the plurality of support hole portions arranged along a circumference at a predetermined distance from the rotation center of the first gear and formed alternately between (i) the surface of the first base portion facing the second base portion and (ii) the surface of the second base portion facing the first base portion.

12. The gear mechanism of claim 11, wherein the supporting block has the plurality of support hole portions arranged along a circumference at a predetermined distance from a rotation center of the first gear.

13. A speed reducer comprising:
the gear mechanism of claim 11
a speed reducing unit connected to the gear mechanism.

14. A drive device comprising:
the speed reducer of claim 13 for reducing a speed of rotation of a rotational drive source and outputting the speed-reduced rotation; and
a rotary block coupled to an output part of the speed reducer.

* * * * *